US012169384B2

(12) United States Patent
Nogami et al.

(10) Patent No.: US 12,169,384 B2
(45) Date of Patent: Dec. 17, 2024

(54) IMAGE FORMING APPARATUS PROVIDED WITH DETACHABLE PROCESSING UNIT

(71) Applicant: CANON KABUSHIKI KAISHA, Tokyo (JP)

(72) Inventors: Kazuaki Nogami, Kanagawa (JP); Takeo Kawanami, Kanagawa (JP); Akinori Mitsumata, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/241,431

(22) Filed: Sep. 1, 2023

(65) Prior Publication Data

US 2023/0408965 A1 Dec. 21, 2023

Related U.S. Application Data

(63) Continuation of application No. 17/742,738, filed on May 12, 2022, now Pat. No. 11,782,378.

(51) Int. Cl.

*G03G 21/16* (2006.01)
*G03G 15/08* (2006.01)
*G03G 21/18* (2006.01)

(52) U.S. Cl.

CPC ..... *G03G 21/1633* (2013.01); *G03G 15/0865* (2013.01); *G03G 21/1676* (2013.01); *G03G 21/1842* (2013.01); *G03G 21/1853* (2013.01)

(58) Field of Classification Search

CPC ........... G03G 15/0865; G03G 15/6555; G03G 21/1633; G03G 21/1647; G03G 21/1676;

(Continued)

(56) References Cited

U.S. PATENT DOCUMENTS 6,212,338 B1 4/2001 Hagihara et al.
10,877,432 B2 12/2020 Saito et al.

(Continued)

FOREIGN PATENT DOCUMENTS

CN 112424698 A 2/2021
JP H06273985 A 9/1994

(Continued)

OTHER PUBLICATIONS

Office Action issued in U.S. Appl. No. 17/742,738, mailed on Mar. 6, 2023.

(Continued)

*Primary Examiner* — Sophia S Chen

(74) *Attorney, Agent, or Firm* — ROSSI, KIMMS & McDOWELL LLP

(57) ABSTRACT

An image forming apparatus includes an apparatus body including an opening portion, and an opening-and-closing member, a process unit detachably attached to and supported by the apparatus body, the process unit including an image bearing member, a toner storage portion, and a supply portion, a sheet supporting portion, and a rotary feeding member. When viewed in a gravity direction, the supply portion is disposed on a same side as a side on which the sheet supporting portion is disposed with respect to the image bearing member, and the opening portion is disposed on a side opposite to the side on which the sheet supporting portion is disposed with respect to the image bearing member. In a case where the opening-and-closing member is positioned at an opening position, the process unit is configured to be attached to and detached from the apparatus body through the opening portion.

20 Claims, 20 Drawing Sheets

(58) Field of Classification Search
CPC ........... G03G 21/1839; G03G 21/1842; G03G 21/1853
See application file for complete search history.

(56) References Cited

U.S. PATENT DOCUMENTS

| | | | | |
|---|---|---|---|---|
| 11,199,794 | B2 | 12/2021 | Takarada et al. | |
| 2013/0136497 | A1 | 5/2013 | Morita et al. | |
| 2018/0267431 | A1 | 9/2018 | Kato | |
| 2020/0371468 | A1 | 11/2020 | Johashi et al. | |
| 2021/0080856 | A1 | 3/2021 | Hashikawa et al. | |
| 2021/0109464 | A1* | 4/2021 | Kaiga | G03G 15/6555 |
| 2021/0232061 | A1 | 7/2021 | Cho et al. | |
| 2021/0247706 | A1* | 8/2021 | Mitsumata | G03G 21/1633 |
| 2022/0082994 | A1* | 3/2022 | Shuhama | G03G 21/1633 |

FOREIGN PATENT DOCUMENTS

| | | | |
|---|---|---|---|
| JP | 2016173404 | A | 9/2016 |
| JP | 2020154300 | A | 9/2020 |
| JP | 2021026218 | A | 2/2021 |
| JP | 2021056323 | A | 4/2021 |

OTHER PUBLICATIONS

Notice of Allowance issued in U.S. Appl. No. 17/742,738, mailed on Jun. 20, 2023.
Office Action issued in Chinese Appln. No. 202210558248.4, mailed Oct. 25, 2024. English translation provided.

* cited by examiner

IMAGE FORMING APPARATUS PROVIDED WITH DETACHABLE PROCESSING UNIT

BACKGROUND OF THE INVENTION

Field of the Invention

The present invention relates to an image forming apparatus that forms images on sheets.

Description of the Related Art

In general, an electrophotographic image-forming apparatus forms an image by transferring a toner image formed on the surface of a photosensitive drum, onto a sheet. For supplying developer, a process-cartridge replacement system or a toner supply system is used. In the process-cartridge replacement system, a process cartridge is replaced with a new cartridge when the developer runs out. In the toner supply system, toner is additionally supplied to a developer container when the toner of the developer container runs out. For example, Japanese Patent Application Publication No. 2021-056323 proposes a process cartridge used for the toner supply system.

The process cartridge described in Japanese Patent Application Publication No. 2021-056323 is exposed to the outside by opening a discharging tray disposed in an upper portion of an image forming apparatus, and a toner pack for supplying toner can be attached to a supplying inlet formed in the process cartridge. In addition, in a state where the discharging tray is opened, the process cartridge can be removed from the apparatus body in an upward direction.

However, in the image forming apparatus described in Japanese Patent Application Publication No. 2021-056323, since the process cartridge is attached to and detached from the apparatus body through a small opening portion exposed to the outside when the discharging tray is opened, the maintainability for the process cartridge has been insufficient.

SUMMARY OF THE INVENTION

According to one aspect of the present invention, an image forming apparatus includes an apparatus body including an opening portion, and an opening-and-closing member configured to move between a closing position at which the opening-and-closing member closes the opening portion and an opening position at which the opening-and-closing member opens the opening portion, a process unit detachably attached to and supported by the apparatus body and configured to form an image on a sheet, the process unit including an image bearing member configured to bear a toner image and rotate, a toner storage portion configured to store toner, and a supply portion configured to communicate with the toner storage portion and receive toner supplied from an outside of the process unit in a state where the process unit is attached to the apparatus body, a sheet supporting portion configured to support the sheet, and a rotary feeding member configured to feed the sheet on the sheet supporting portion. When viewed in a gravity direction, the supply portion is disposed on a same side as a side on which the sheet supporting portion is disposed with respect to the image bearing member, and the opening portion is disposed on a side opposite to the side on which the sheet supporting portion is disposed with respect to the image bearing member. In a case where the opening-and-closing member is positioned at the opening position, the process unit is configured to be attached to and detached from the apparatus body through the opening portion.

Further features of the present invention will become apparent from the following description of exemplary embodiments with reference to the attached drawings.

DESCRIPTION OF THE EMBODIMENTS

Hereinafter, embodiments of the present invention will be described in detail, based on examples and with reference to the accompanying drawings. Note that the size, material, shape, and relative arrangement of components described in the embodiments may be changed as appropriate in accordance with a configuration of the apparatus for which the present invention is applied, and with various conditions. That is, the scope of the present invention is not limited to the below-described embodiments.

First Embodiment

Figure 1:
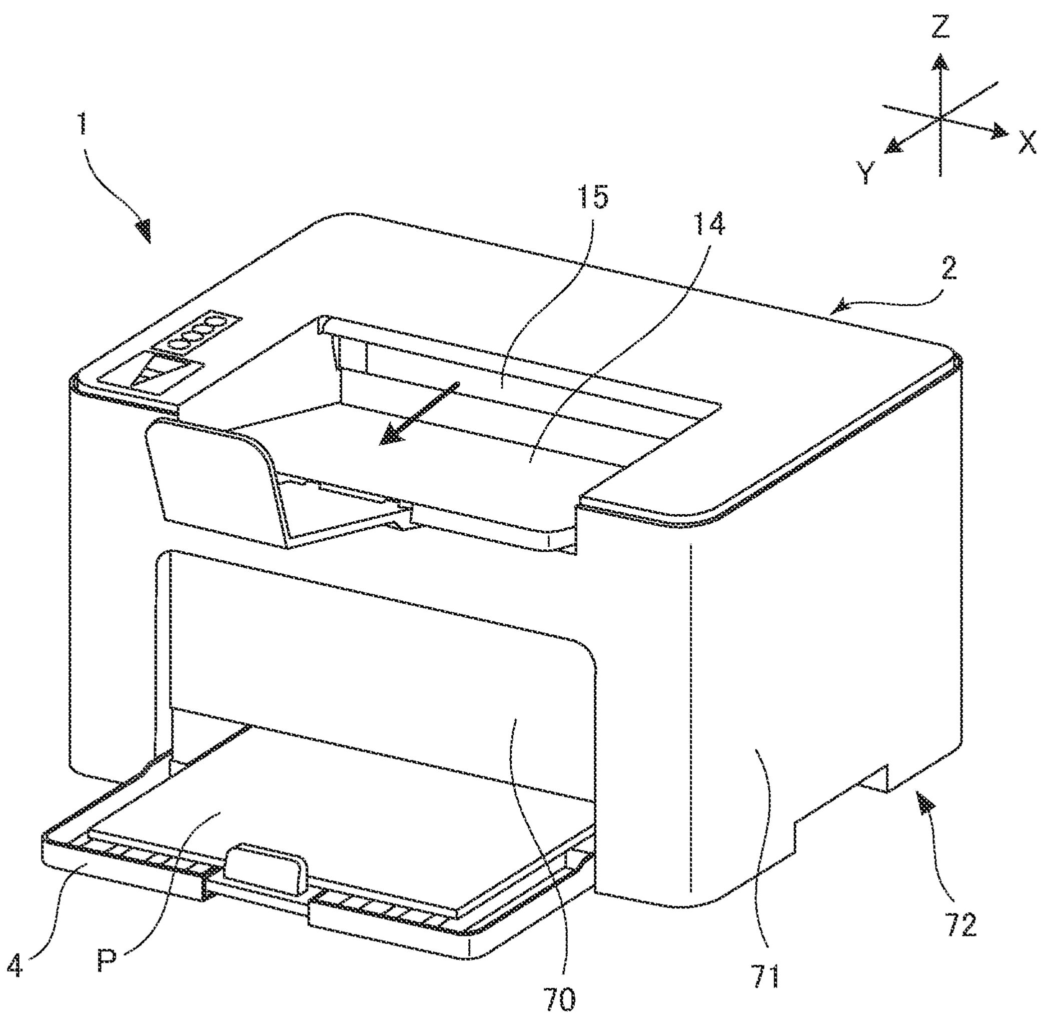
FIG. 1 is a schematic diagram illustrating the whole of an image forming apparatus.
Figure 2:
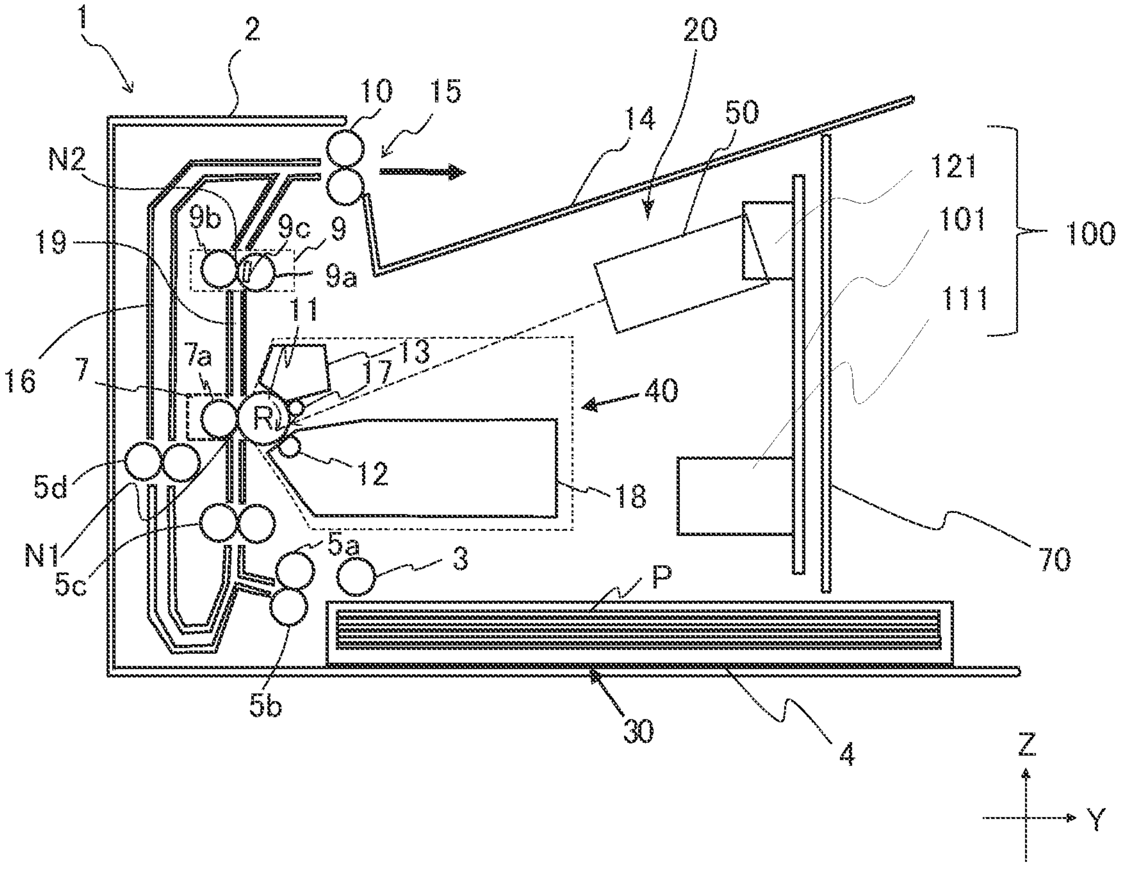
FIG. 2 is a cross-sectional view illustrating a configuration of the image forming apparatus.

FIG. 1 is a perspective view illustrating an image forming apparatus 1 of a first embodiment. FIG. 2 is a cross-sectional view illustrating a configuration of the image forming apparatus 1. The image forming apparatus 1 is a monochrome printer that forms an image on a recording material in accordance with image information sent from an external device. The recording material may be of a variety of sheets having different materials. For example, the recording material may be a paper sheet such as a plain paper sheet or a thick paper sheet, a plastic film used as a sheet for overhead projectors, a specialized shape of sheet such as an envelope or an index paper sheet, or a cloth sheet.

In the following description, a height direction (opposite to the vertical direction) of the image forming apparatus 1 placed on a horizontal plane is defined as a Z direction. In addition, a direction that intersects the Z direction and that is parallel with a rotation-axis direction (i.e., main scanning direction) of a later-described photosensitive drum 11 is defined as an X direction. In addition, a direction that intersects the X direction and the Z direction is defined as a Y direction. Preferably, the X direction, the Y direction, and the Z direction intersect each other at right angles. For convenience of the description, a positive direction of the X direction is referred to as a right side, a negative direction of the X direction is referred to as a left side, a positive direction of the Y direction is referred to as a front side or a front surface side, a negative direction of the Y direction is referred to as a back side or a back surface side, a positive direction of the Z direction is referred to as an upper side, and a negative direction of the Z direction is referred to as a lower side.

Overall Configuration

As illustrated in FIGS. 1 and 2, the image forming apparatus 1 includes an image forming portion 20, a feeding portion 30, a fixing portion 9, and a discharging roller pair 10. The image forming portion 20 forms a toner image on a recording material; the feeding portion 30 feeds the recording material P; and the fixing portion 9 fixes the toner image formed by the image forming portion 20, to the recording material.

The image forming portion 20 includes a scanner unit 50, an electrophotographic process unit 40, and a transfer unit 7. The transfer unit 7 includes a transfer roller 7*a*, which transfers a toner image borne by the photosensitive drum 11 of the process unit 40, onto the recording material P that is a sheet. The process unit 40 includes the photosensitive drum 11, a cleaning unit 13, a charging roller 17, a developing roller 12, and a developer container 230 (see FIG. 8) that includes a storage portion 18 that stores toner. The cleaning unit 13, the charging roller 17, and the developing roller 12 are disposed around the photosensitive drum 11. The transfer roller 7*a* is urged toward the photosensitive drum 11 by an urging member (not illustrated).

The photosensitive drum 11, which serves as an image bearing member, is a cylindrical photosensitive member. The photosensitive drum 11 of the present embodiment includes a drum-like base body, and a photosensitive layer formed on the base body. The base body is made of aluminum, and the photosensitive layer is made of organic photoreceptor that is negatively charged. In addition, the photosensitive drum 11, which is an image bearing member, is driven and rotated by a motor at a predetermined process speed in a predetermined direction (i.e., R direction in FIG. 2).

The charging roller 17 is brought into contact with the photosensitive drum 11 by a predetermined pressure contact force, and forms a charging portion. The charging roller 17 is applied with a desired charging voltage by a charging high-voltage power supply, and thereby uniformly charges the surface of the photosensitive drum 11 at a predetermined electric potential. In the present embodiment, the photosensitive drum 11 is negatively charged by the charging roller 17.

The scanner unit 50 generates a laser beam in accordance with image information sent from an external device, and emits the laser beam to the photosensitive drum 11 via a polygon mirror for scanning and exposing the surface of the photosensitive drum 11. With this exposure, an electrostatic latent image is formed on the surface of the photosensitive drum 11 in accordance with the image information. Note that the scanner unit 50 is not limited to the laser scanner apparatus. For example, the scanner unit 50 used may be an LED exposure apparatus including an LED array, in which a plurality of LEDs is arrayed along a longitudinal direction of the photosensitive drum 11.

Figure 3:
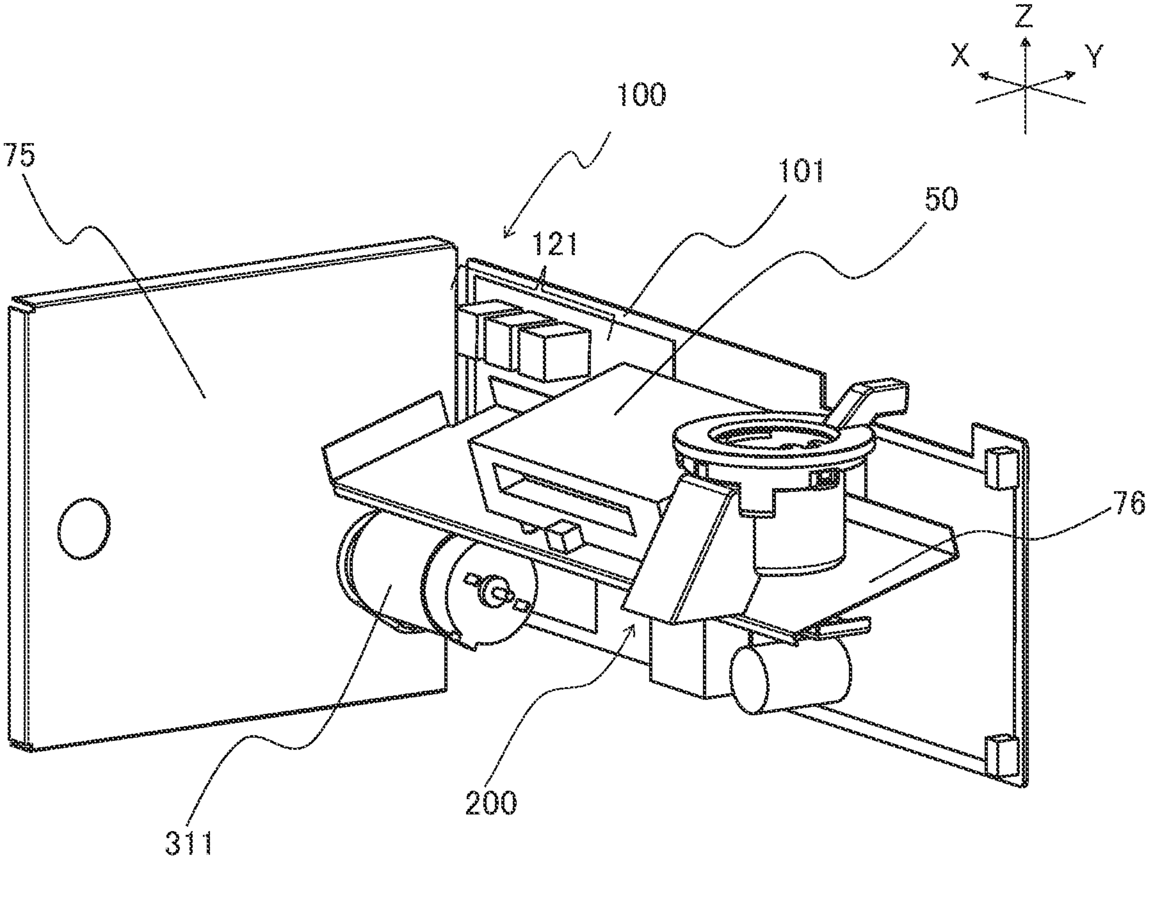
FIG. 3 is a perspective view illustrating an internal configuration of the image forming apparatus.
Figure 5:
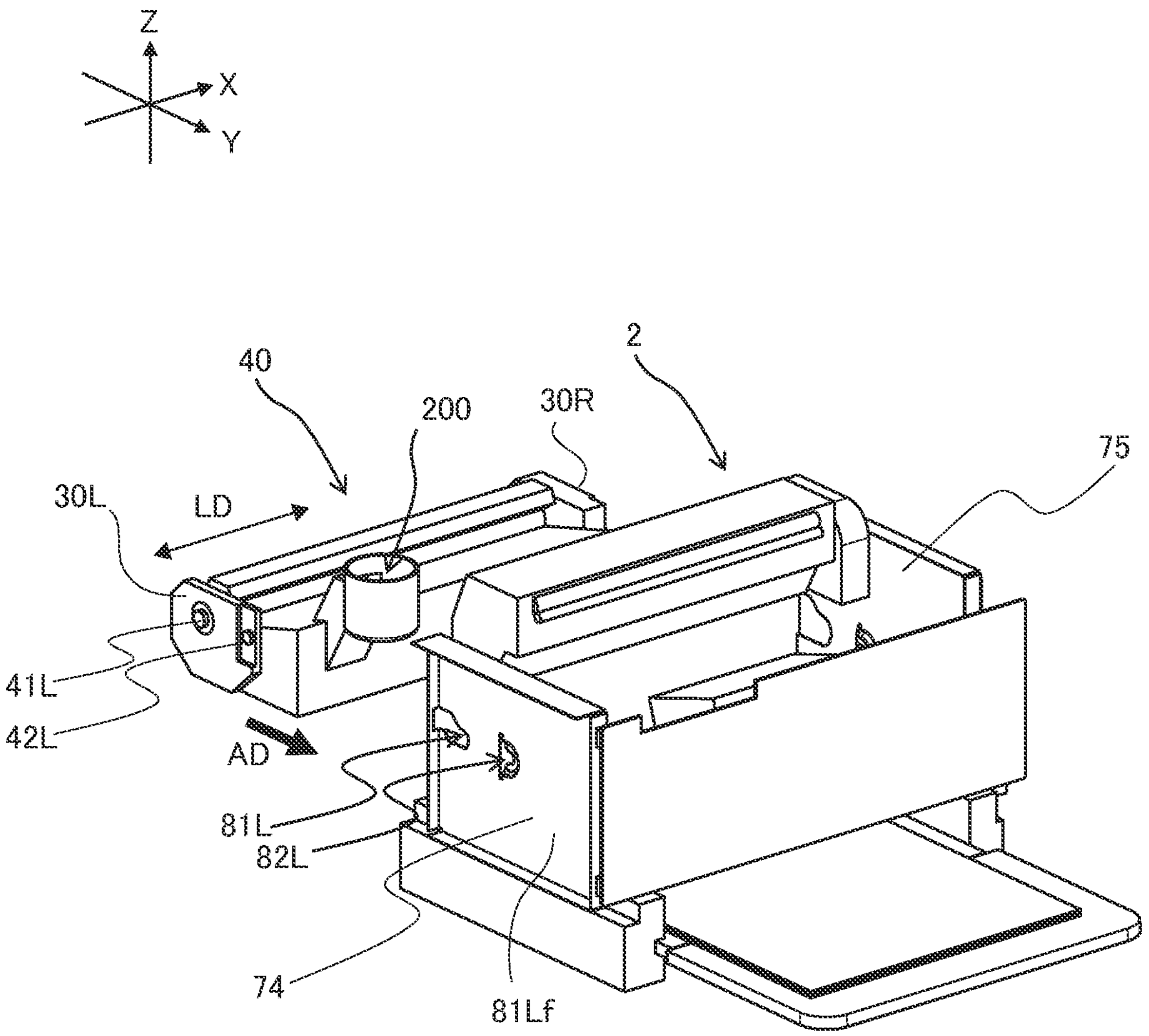
FIG. 5 is a perspective view illustrating the image forming apparatus that is in a state before a process unit is attached to the image forming apparatus.

As illustrated in FIGS. 3 and 5, an apparatus body 2 of the image forming apparatus 1 includes a left side-plate frame 74 and a right side-plate frame 75. Between the left side-plate frame 74 and the right side-plate frame 75, a scanner holding member 76 is suspended. The scanner holding member 76 holds the scanner unit 50. In addition, a driving motor 311 that serves as a driving source is attached to the right side-plate frame 75, and a pinion gear joined with the driving motor 311 is disposed on the right side-plate frame 75 side, that is, on the positive-direction side (right side) of the X direction. The driving force of the driving motor 311 is transmitted to the feed roller 5*a* and the photosensitive drum 11, via the pinion gear.

As illustrated in FIGS. 1 and 2, the developing roller 12 is rotatably supported by the storage portion 18, which serves as a toner storage portion. In addition, the developing roller 12 is disposed in an opening portion of the developer container 230 (see FIG. 8) that includes the storage portion 18, so as to face the photosensitive drum 11. Note that a supplying roller may be disposed in the storage portion 18 for applying the toner, contained in the storage portion 18 and serving as the developer, onto the surface of the developing roller 12.

In the process unit 40 of the present embodiment, a contact developing system is used as a developing system. That is, a toner layer borne by the developing roller 12 contacts the photosensitive drum 11 in a developing portion (developing area) in which the photosensitive drum 11 and the developing roller 12 face each other. The developing roller 12 is applied with a developing voltage by a developing high-voltage power supply. Thus, the toner borne by the developing roller 12 is transferred from the developing roller 12 to the surface of the photosensitive drum 11 by the developing voltage in accordance with the electric potential distribution of the surface of the photosensitive drum 11. As a result, the electrostatic latent image is developed into a toner image.

In addition, the toner of the present embodiment is a so-called one-component nonmagnetic developer that contains no magnetic component. Thus, the toner of the present embodiment is borne by the developing roller 12, mainly due to the intermolecular force or the electrostatic force (image force). However, a one-component developer that contains magnetic component may be used. These one-component developers may contain not only toner particles but also additives (e.g., wax and silica fine particles) for adjusting the fluidity and charging capability of the toner. In another case, two-component developer that contains non-magnetic toner and magnetic carrier may be used as the developer. In a case where the magnetic developer is used, a cylindrical developing sleeve may be used as a developer bearing member, and the developing sleeve may have a magnet disposed inside the developing sleeve.

The fixing portion 9 is a heat fixing system that performs an image fixing process by heating and melting a toner image formed on a recording material and applying pressure to the toner image. The fixing portion 9 includes a heating roller 9*a* that includes a fixing heater 9*c*, and a pressing roller 9*b* that is in pressure contact with the heating roller 9*a*.

The feeding portion 30 includes a cassette 4, a pickup roller 3, a feed roller 5*a*, and a separation roller 5*b*. The cassette 4 serves as a sheet supporting portion on which the recording material P is stacked. The pickup roller 3 serves as a rotary feeding member. Note that the pickup roller 3 may not be a roller, and may be another rotary member, such as a belt. In a portion of the front surface of the image forming apparatus 1, a front cover 70 is disposed. The front cover 70 covers a circuit board 100. The apparatus body 2 of the image forming apparatus 1 includes a housing 72. The housing 72 includes the front cover 70, a discharging tray 14, a back cover 73 (see FIG. 17A), and an exterior cover 71. The exterior cover 71 serves as an exterior of the image forming apparatus 1 other than the front cover 70, the discharging tray 14, and the back cover 73. In addition, an outlet 15 is formed in the housing 72, and a sheet to be discharged to the discharging tray 14 passes through the outlet 15.

As illustrated in FIG. 2, the image forming apparatus 1 includes the circuit board 100. The circuit board 100 includes a wiring board 101 made of insulator, and electronic components 111 and 121 soldered to the wiring board 101. Since conductor wires are disposed above and in the wiring board 101, the electronic components 111 and 121 are electrically connected with each other. For example, the circuit board 100 has a function that converts an alternating current supplied from the outside of the image forming apparatus 1, into a direct current, and a function that converts an input voltage for obtaining a predetermined voltage necessary for the image forming process.

The circuit board 100 is oriented such that the discharging direction intersects a surface of the wiring board 101 on which the electronic components 111 and 121 are mounted. In addition, the wiring board 101 is disposed between the front cover 70 and the scanner unit 50 in the discharging direction. The electronic components 111 and 121 are mounted on the surface of the wiring board 101 that faces the scanner unit 50.

Next, an image forming operation of the image forming apparatus 1 will be described. When an image forming instruction is received by the image forming apparatus 1, the image forming portion 20 starts an image forming process in accordance with image information sent from an external computer connected to the image forming apparatus 1. The scanner unit 50 emits a laser beam toward the photosensitive drum 11 in accordance with the image information received by the image forming apparatus 1. The photosensitive drum 11 is charged in advance by the charging roller 17. Thus, when the laser beam is emitted to the photosensitive drum 11, an electrostatic latent image is formed on the photosensitive drum 11. The electrostatic latent image is then developed by the developing roller 12, and a toner image is formed on the photosensitive drum 11.

In parallel with the above-described image forming process, the pickup roller 3 of the feeding portion 30 feeds the recording material P supported by the cassette 4. The recording material P fed by the pickup roller 3 is separated from others, one by one, by the feed roller 5*a* and the separation roller 5*b*, and conveyed to a conveyance roller pair 5*c*. The recording material P is then conveyed by the conveyance roller pair 5*c*, which serves as a conveyance portion, toward a transfer nip N1 formed by the transfer roller 7*a* and the photosensitive drum 11.

The transfer roller 7*a* is applied with a transfer voltage by a transfer high-voltage power source, and the toner image borne by the photosensitive drum 11 is transferred onto the recording material P conveyed by the conveyance roller pair 5*c*. The recording material P onto which the toner image has been transferred is then conveyed to the fixing portion 9, and the toner image is heated and pressed when the recording material P passes through a fixing nip N2 formed between the heating roller 9*a* and the pressing roller 9*b* of the fixing portion 9. With this operation, toner particles are melted, and then solidify and adhere to the recording material P, so that the toner image is fixed to the recording material P. The recording material P having passed through the fixing portion 9 is discharged to the outside of the image forming apparatus 1 from the outlet 15 by the discharging roller pair 10, and stacked on the discharging tray 14.

If images are to be formed on both sides of the recording material P, the recording material P having an image formed on a first surface thereof is switch-backed by the discharging roller pair 10, and is guided to a duplex conveyance path 16. The recording material P having been guided to the duplex conveyance path 16 is conveyed again toward the transfer roller 7*a* through a conveyance path 19, by a duplex-conveyance roller pair 5*d*. After an image is formed on a second surface of the recording material P by the transfer roller 7*a*, the recording material P is discharged to the outside of the image forming apparatus 1 by the discharging roller pair 10. The toner left on the photosensitive drum 11 after a toner image is transferred to the recording material P is removed by the cleaning unit 13.

Control Block

Figure 4:
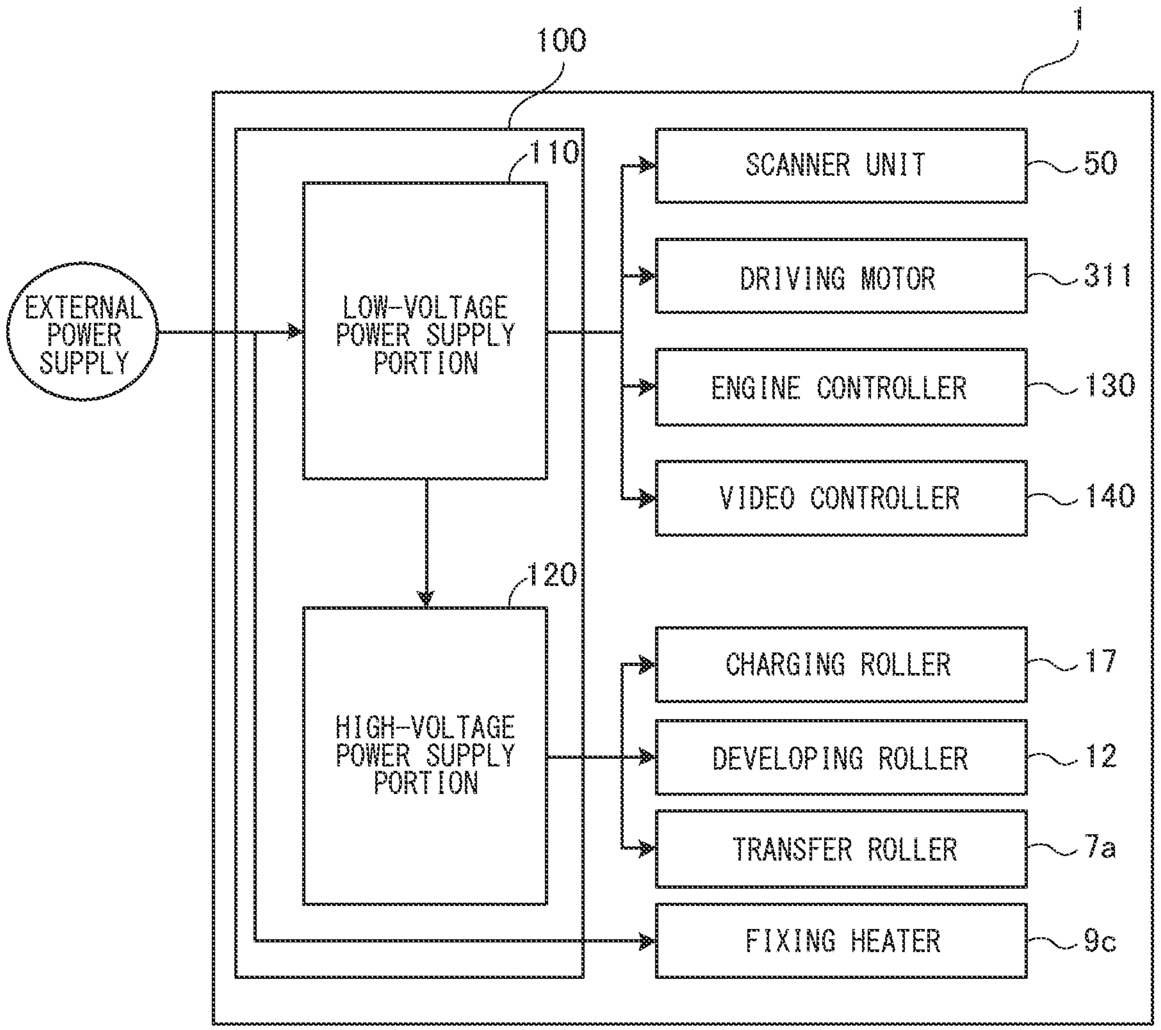
FIG. 4 is a block diagram for illustrating functions of a power supply board.

FIG. 4 is a block diagram for illustrating functions of the circuit board 100 of the present embodiment. The circuit board 100 includes a low-voltage power supply portion 110 and a high-voltage power supply portion 120. The low-voltage power supply portion 110 receives electric power from an external power supply through a power-supply input portion (not illustrated) mounted on an edge portion of the board, and causes a rectifying and smoothing circuit that includes an electrolytic capacitor, to convert an alternating-current voltage into a stable direct-current voltage. Then the low-voltage power supply portion 110 causes switching elements, such as transistors, to convert the direct-current voltage into high-frequency alternating-current voltage, and applies the high-frequency alternating-current voltage to a low-voltage power transformer. The low-voltage power transformer converts the high-frequency alternating-current voltage, which is an input voltage, into an alternating-current voltage (output voltage) having a desired voltage value. The low-voltage power supply portion 110 then converts the alternating-current voltage into a direct-current voltage again, and outputs the direct-current voltage to the high-voltage power supply portion 120. In the low-voltage power supply portion 110, since the loss in each circuit component becomes heat, a heatsink (not illustrated) made of aluminum or iron is disposed for dissipating the heat.

The high-voltage power supply portion 120 converts the voltage (e.g., 24 V) supplied from the low-voltage power supply portion 110, into high voltages necessary for image forming processes including the charging process, the developing process, and the transfer process. The voltage supplied from the low-voltage power supply portion 110 is converted into a voltage used for the charging process, by a transformer used for the charging process; and is supplied to the charging roller 17. In addition, the voltage supplied from the low-voltage power supply portion 110 is converted into a voltage used for the developing process, by a transformer used for the developing process; and is supplied to the developing roller 12. In addition, the voltage supplied from the low-voltage power supply portion 110 is converted into a voltage used for the transfer process, by a transformer used for the transfer process; and is supplied to the transfer roller 7*a*.

The low-voltage power supply portion 110 supplies voltages (e.g., 3.3 V or 5 V) not only to the high-voltage power supply portion 120, but also to the scanner unit 50, the driving motor 311, an engine controller 130, and a video controller 140. The engine controller 130 serves as a control portion, and controls the whole of various process members. The engine controller 130 includes a CPU (not illustrated), a RAM (not illustrated), and a ROM (not illustrated). The RAM is used for performing computation on data necessary for controlling the image forming apparatus 1, and for temporarily storing data. The ROM is used for storing a program that controls the image forming apparatus 1, and for storing a variety of types of data. The video controller 140 receives print data by communicating with an external device such as a personal computer, analyzes the print data, and sends the result of analysis to the engine controller 130. Note that the engine controller 130 and the video controller 140 may be mounted on another board other than the circuit board 100, or may be mounted on the circuit board 100.

The alternating-current electric power that the power-supply input portion receives from a commercial power source is supplied not only to the low-voltage power supply portion 110, but also to the fixing heater 9*c*. Note that the rollers of the fixing portion 9 are driven by the driving motor 311.

Configuration for Positioning Process Unit

Figure 6A:
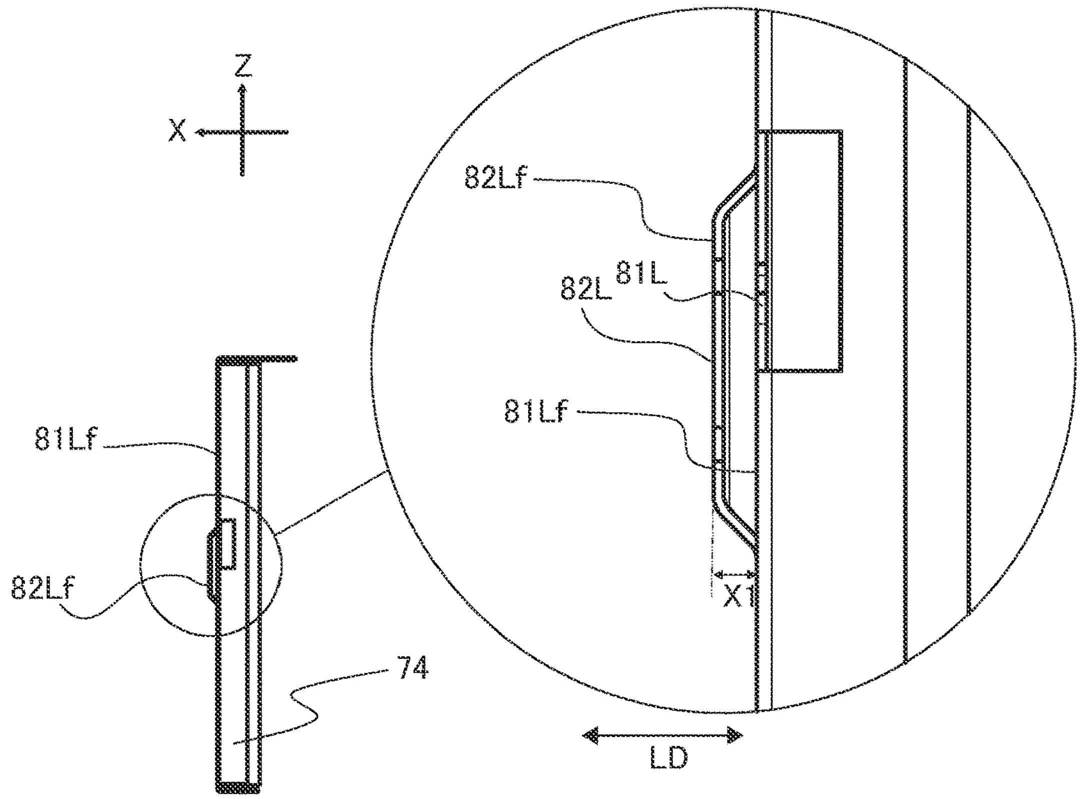
FIG. 6A is a rear view and an enlarged view illustrating a configuration in which the process unit is positioned by a left side-plate frame.
Figure 6B:
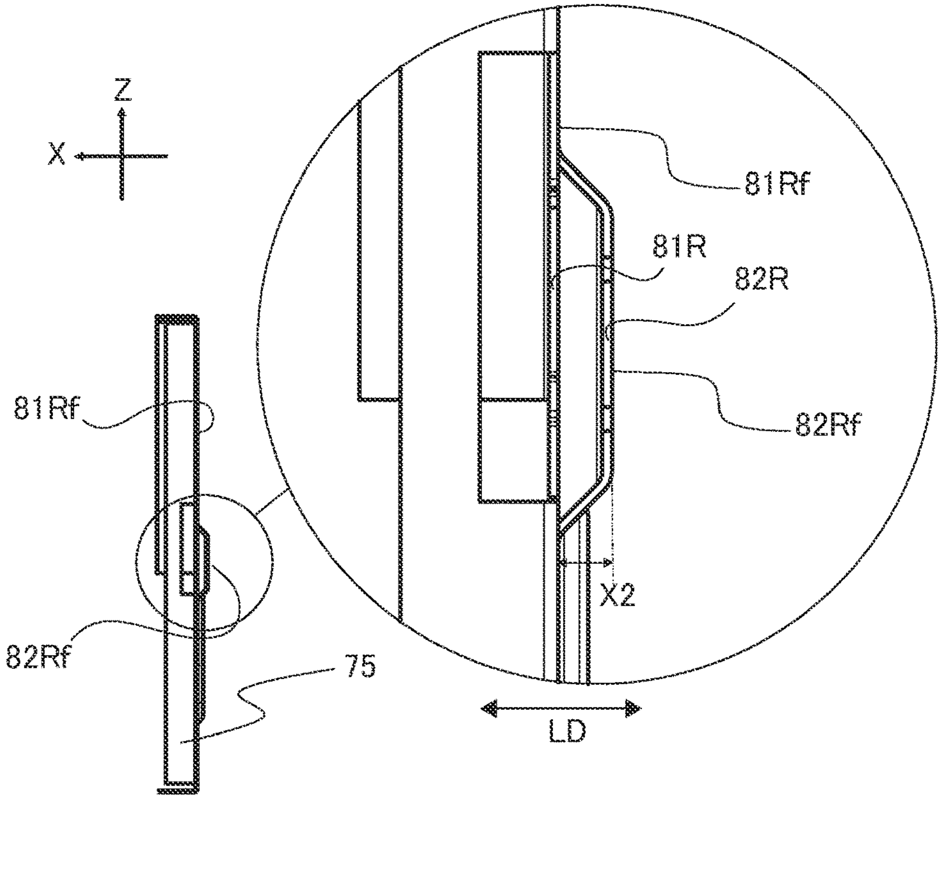
FIG. 6B is a rear view and an enlarged view illustrating a configuration in which the process unit is positioned by a right side-plate frame.

Next, a configuration for positioning the process unit 40 will be described with reference to FIGS. 5 to 7. FIG. 5 is a perspective view illustrating the image forming apparatus 1 that is in a state before the process unit 40 is attached to the image forming apparatus 1. FIG. 6A is a rear view and an enlarged view illustrating a configuration in which the process unit 40 is positioned by the left side-plate frame 74. FIG. 6B is a rear view and an enlarged view illustrating a configuration in which the process unit 40 is positioned by the right side-plate frame 75.

As illustrated in FIG. 5, the process unit 40 includes a left side surface 30L and a right side surface 30R, which are end surfaces of the process unit 40 in a longitudinal direction LD parallel with the X direction indicated by an arrow. The left side surface 30L is provided with a left positioning boss 41L and a left rotation-prevention boss 42L, and the right side surface 30R is provided with a right positioning boss (not illustrated) and a right rotation-prevention boss (not illustrated). The left positioning boss 41L and the right positioning boss are respectively disposed upstream of the left rotation-prevention boss 42L and the right rotation-prevention boss in an attachment direction AD of the process unit 40.

Note that although the boss-shaped positioning bosses and the boss-shaped rotation-prevention bosses are disposed on the process unit 40 in the present embodiment, the present disclosure is not limited to this. That is, positioning portions that are not boss-shaped and rotation-prevention portions that are not boss-shaped may be disposed on the process unit 40.

The apparatus body 2 of the image forming apparatus 1 includes the left side-plate frame 74 and the right side-plate frame 75, which are metal-plate members. The left side-plate frame 74 and the right side-plate frame 75 face each other via a clearance in the longitudinal direction LD that serves as a second direction.

As illustrated in FIGS. 5 and 6A, the left side-plate frame 74 includes a first left surface 81Lf and a second left surface 82Lf, which extend along the attachment direction AD (Y direction) and the Z direction. The second left surface 82Lf is formed by performing a drawing process on the first left surface 81Lf; and is disposed inside the apparatus body 2 with respect to the first left surface 81Lf by a distance X1 in the longitudinal direction LD. That is, the first left surface 81Lf and the second left surface 82Lf are not flush with each other. In the present embodiment, the second left surface 82Lf that serves as a second surface is a surface extending in parallel with the attachment direction AD (Y direction) and the Z direction. However, the present disclosure is not limited to this. For example, the second left surface 82Lf may be a curved surface that extends along the attachment direction AD (Y direction) and the Z direction.

The first left surface 81Lf has a left positioning portion 81L that the left positioning boss 41L can engage with. The left positioning portion 81L is a cutout whose upstream portion in the attachment direction AD is opened. The second left surface 82Lf has a left rotation-prevention portion 82L that the left rotation-prevention boss 42L can engage with. The left rotation-prevention portion 82L is a U-shaped cutout whose upstream portion in the attachment direction AD is opened. Note that since the second left surface 82Lf is formed through the drawing process, a slope that guides the left positioning boss 41L toward the left positioning portion 81L may be formed in the second left surface 82Lf.

In addition, since the first left surface 81Lf and the second left surface 82Lf are separated from each other by the distance X1 in the longitudinal direction LD, the left rotation-prevention portion 82L is also separated from the left positioning portion 81L by the distance X1 in the longitudinal direction LD. In other words, the left rotation-prevention portion 82L is disposed at a position different from the position of the left positioning portion 81L in the longitudinal direction LD.

Similarly, as illustrated in FIGS. 5 and 6B, the right side-plate frame 75 includes a first right surface 81Rf and a second right surface 82Rf, which extend along the attachment direction AD (Y direction) and the Z direction. The second right surface 82Rf is formed by performing a drawing process on the first right surface 81Rf; and is disposed inside the apparatus body 2 with respect to the first right surface 81Rf by a distance X2 in the longitudinal direction LD. That is, the first right surface 81Rf and the second right surface 82Rf are not flush with each other. In the present embodiment, the first right surface 81Rf and the second right surface 82Rf are surfaces extending in parallel with the attachment direction AD (Y direction) and the Z direction. However, the present disclosure is not limited to this. For example, the second right surface 82Rf may be a curved surface that extends along the attachment direction AD (Y direction) and the Z direction.

The first right surface 81Rf has a right positioning portion 81R that the right positioning boss can engage with. The right positioning portion 81R is a cutout whose upstream portion in the attachment direction AD is opened. The second right surface 82Rf has a right rotation-prevention portion 82R that the right rotation-prevention boss can engage with. The right rotation-prevention portion 82R is a U-shaped cutout whose upstream portion in the attachment direction AD is opened. Note that since the second right surface 82Rf is formed through the drawing process, a slope that guides the right positioning boss toward the right positioning portion 81R may be formed in the second right surface 82Rf.

In addition, since the first right surface 81Rf and the second right surface 82Rf are separated from each other by the distance X2 in the longitudinal direction LD, the right rotation-prevention portion 82R is also separated from the right positioning portion 81R by the distance X2 in the longitudinal direction LD. In other words, the right rotation-prevention portion 82R is disposed at a position different from the position of the right positioning portion 81R in the longitudinal direction LD.

Figure 7:
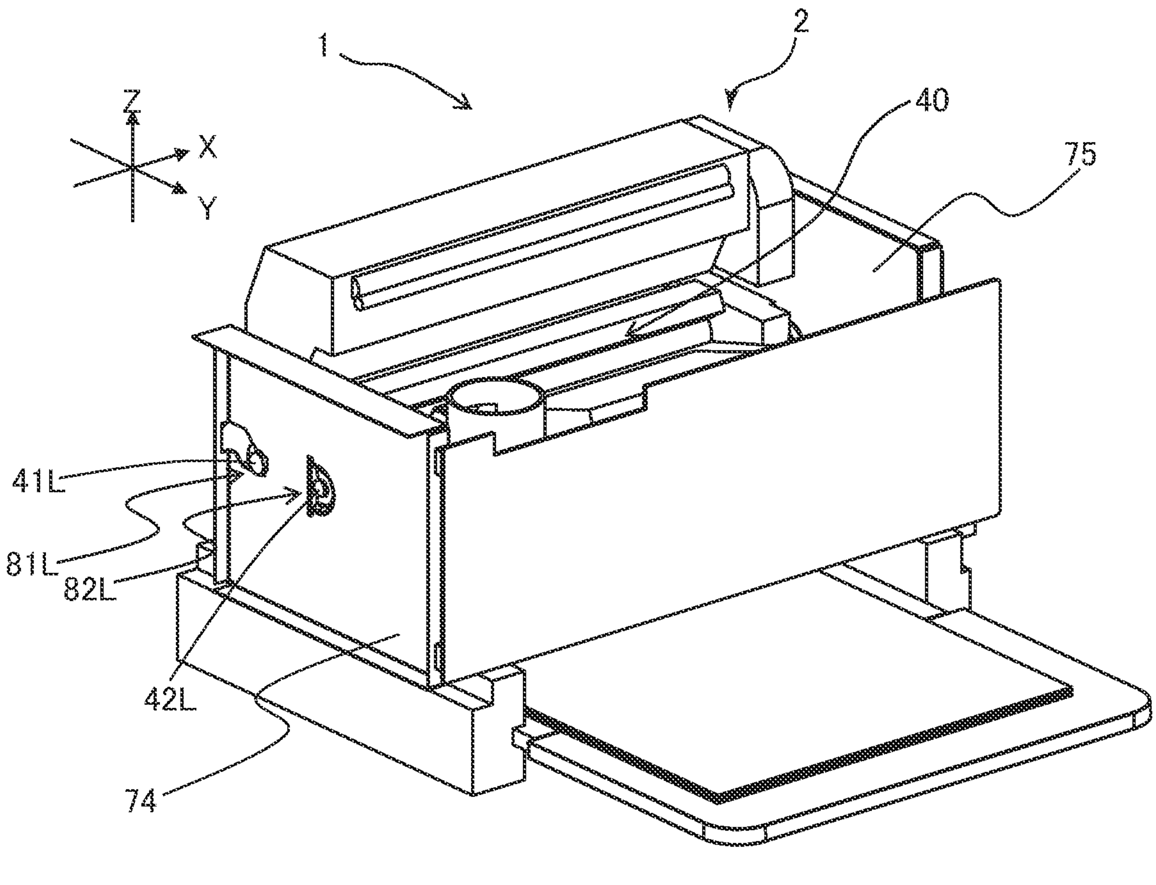
FIG. 7 is a perspective view illustrating the image forming apparatus that is in a state where the process unit is attached to the image forming apparatus.

FIG. 7 is a perspective view illustrating the image forming apparatus 1 that is in a state where the process unit 40 is attached to the image forming apparatus 1. As illustrated in FIGS. 5 to 7, in a state where the process unit 40 is attached to the apparatus body 2, the left positioning boss 41L of the process unit 40 is engaged with the left positioning portion 81L of the left side-plate frame 74, and the left rotation-prevention boss 42L of the process unit 40 is engaged with the left rotation-prevention portion 82L of the left side-plate frame 74. Similarly, in a state where the process unit 40 is attached to the apparatus body 2, the right positioning boss of the process unit 40 is engaged with the right positioning portion 81R of the right side-plate frame 75, and the right rotation-prevention boss of the process unit 40 is engaged with the right rotation-prevention portion 82R of the right side-plate frame 75.

The process unit 40 is positioned in the attachment direction AD by the left positioning boss 41L being engaged with the left positioning portion 81L and the right positioning boss being engaged with the right positioning portion 81R. In addition, the process unit 40 is prevented from rotating on the left positioning boss 41L and the right positioning boss by the left rotation-prevention boss 42L being engaged with the left rotation-prevention portion 82L and the right rotation-prevention boss being engaged with the right rotation-prevention portion 82R. That is, the process unit 40 is positioned in the Z direction that serves as a first direction.

Figure 19A:
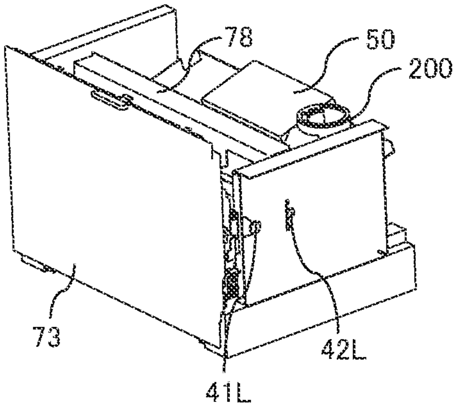
FIG. 19A is a perspective view illustrating the image forming apparatus that is in a state where the back cover is closed.
Figure 19B:
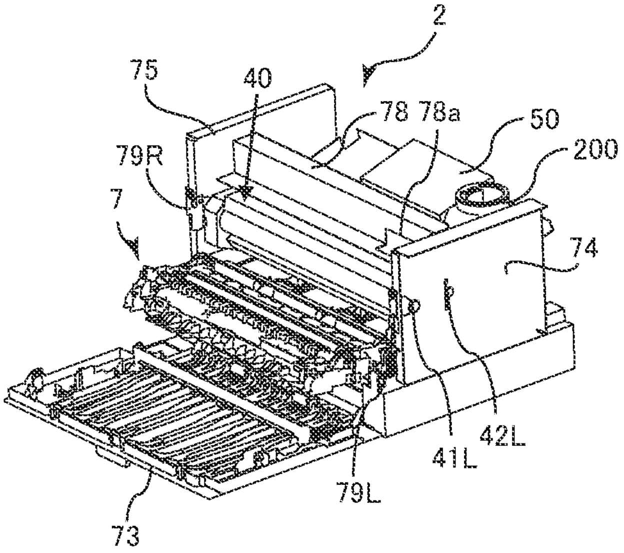
FIG. 19B is a perspective view illustrating the image forming apparatus that is in a state where the transfer unit is opened.

In this state, the process unit 40 is fixed to the left side-plate frame 74 and the right side-plate frame 75 by later-described fixing members 79L and 79R (see FIG. 19B), in a direction from the back surface side toward the front surface side.

In the present embodiment, since the left positioning portion 81L and the left rotation-prevention portion 82L are formed in the left side-plate frame 74 that is a single metal-plate member, the cumulative tolerance is reduced and the positioning accuracy of the process unit 40 is increased. In addition, since the left positioning portion 81L is disposed upstream of the left rotation-prevention portion 82L in the attachment direction AD, the cutout of the left positioning portion 81L formed in the first left surface 81Lf has less area. Since the cutout formed in the left side-plate frame 74 has less area, the rigidity of the left side-plate frame 74 is kept. Since the rigidity of the left side-plate frame 74 is kept, the positioning accuracy of the process unit 40 with respect to the apparatus body 2 is increased. In addition, since there is no need to make the left side-plate frame 74 thick, the weight and cost of the left side-plate frame 74 are reduced. The same holds true for the right side-plate frame 75.

Developer Container

Figure 8:
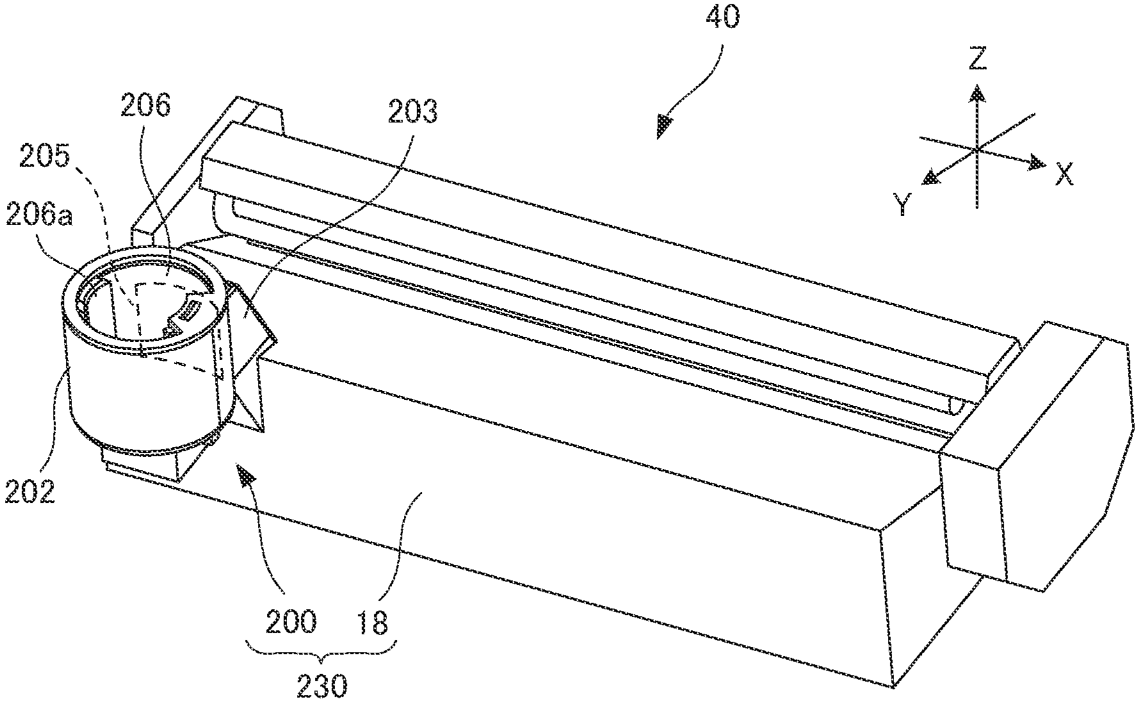
FIG. 8 is a perspective view illustrating the process unit.

Next, the developer container 230 and its surroundings will be described with reference to FIGS. 8 and 9. As illustrated in FIG. 8, the developer container 230 includes a storage portion 18 and a supply portion 200. The supply portion 200 communicates with the storage portion 18, and receives toner supplied from the outside of the process unit 40 in a state where the process unit 40 is attached to the apparatus body 2. The supply portion 200 includes an operation portion 201, a toner receiving portion 202 that is cylindrical, a supply path portion 203 that connects the toner receiving portion 202 and the storage portion 18, and a main-body shutter portion 206 that serves as a main-body shutter. In the inner wall of the toner receiving portion 202, a side-surface opening portion 205 is formed so as to communicate with the supply path portion 203.

Figure 9:
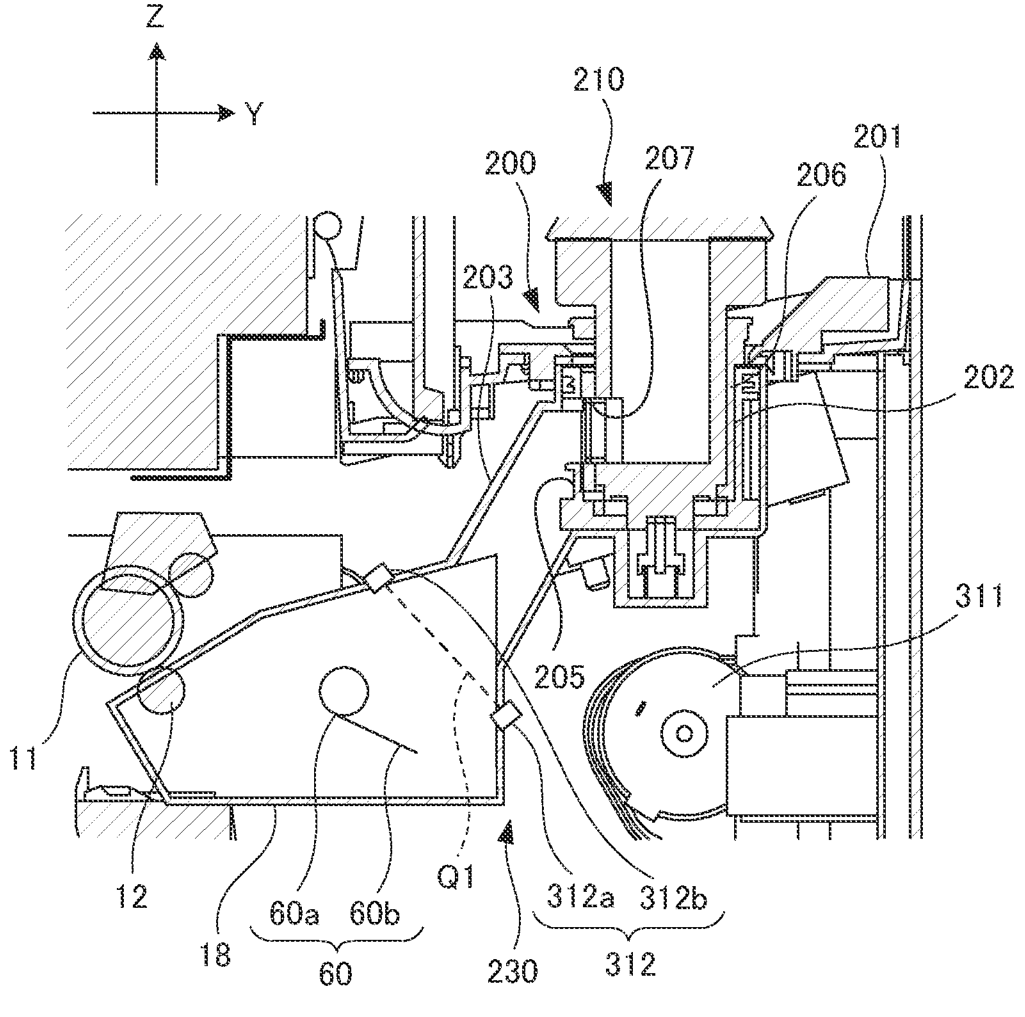
FIG. 9 is a cross-sectional view illustrating a supply portion and a developer container.

As illustrated in FIG. 9, a later-described supply pack 210 is attached to the supply portion 200, and the toner discharged from the supply pack 210 is supplied to the storage portion 18 through the opening portion 207 of the main-body shutter portion 206, the side-surface opening portion 205 of the toner receiving portion 202, and the supply path portion 203.

As illustrated in HG 8, the supply path portion 203 is joined with a portion of the storage portion 18 formed on one end side of the storage portion 18 in the longitudinal direction of the developer container 230, that is, in the X direction. As illustrated in FIG. 9, an agitating member 60 is disposed in the storage portion 18. The agitating member 60 rotates on a rotation shaft 60*a* that extends in the X direction. The agitating member 60 includes a blade portion 60*b* fixed to the rotation shaft 60*a*. The blade portion 60*b* is driven and rotated by the driving motor 311, so that the toner in the storage portion 18 is agitated and conveyed toward the developing roller 12. Note that although the agitating member 60 includes the rotation shaft 60*a* and the blade portion 60*b* in the present embodiment, the agitating member 60 may be a spiral-shaped agitating member for conveying the toner from one end to the other end of the storage portion 18 in the longitudinal direction of the storage portion 18.

In addition, the agitating member 60 circulates the toner having not been used for the developing and removed from the developing roller 12, in the storage portion 18; and thereby makes the toner of the storage portion 18 uniform in the storage portion 18. Note that the agitating member 60 that rotates may not be used. Instead, another agitating member that swings may be used, for example. In addition, another agitating member may be disposed in addition to the agitating member 60.

The storage portion 18 also includes a remaining-amount detection portion 312, which is a sensor for detecting the amount of toner contained in the storage portion 18. The remaining-amount detection portion 312 includes a light emitting portion 312*a* and a light receiving portion 312*b*. The light emitted from the light emitting portion 312*a* passes through the interior of the storage portion 18, and is received by the light receiving portion 312*b*. That is, the light emitting portion 312*a* and the light receiving portion 312*b* produce an optical path Q1, which is formed in the storage portion 18. Note that a light emitting element of the light emitting portion 312*a* and a light receiving element of the light receiving portion 312*b* may be disposed inside the storage portion 18. In another case, a light emitting element and a light receiving element may be disposed outside the storage portion 18, and the light may be guided into and out of the storage portion 18 via light guiding portions.

The light emitting portion 312*a* and the light receiving portion 312*b* are disposed in a center portion of the storage portion 18 in the X direction. Since the light emitting portion 312*a* and the light receiving portion 312*b* are disposed in a center portion of the storage portion 18, the amount of remaining toner of the storage portion 18 can be reliably detected. That is, the developer (toner) is unevenly distributed in end portions of the storage portion 18 in the X direction, but less unevenly distributed in a center portion of the storage portion 18. Thus, in practical use, the amount of remaining toner can be detected in the center portion.

Note that in the present embodiment, the light emitting portion 312*a* uses an LED, and the light receiving portion 312*b* uses a phototransistor that turns on when receiving the light from the LED. However, the present disclosure is not limited to this. For example, the light emitting portion 312*a* may use a halogen lamp or a fluorescent lamp, and the light receiving portion 312*b* may use a photodiode or an avalanche photodiode.

Supply Portion

Figure 10A:
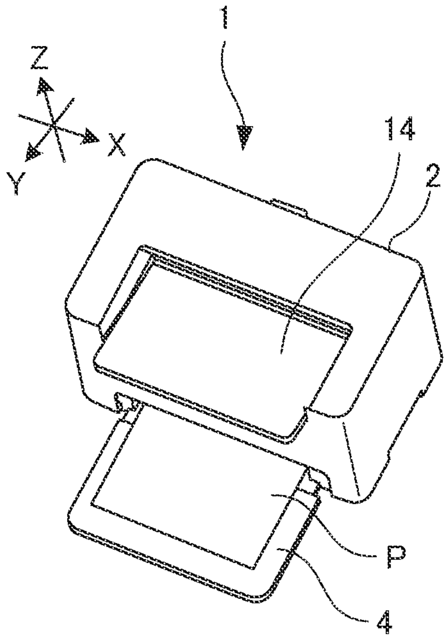
FIG. 10A is a perspective view illustrating the image forming apparatus that is in a state where a discharging tray is closed.
Figure 10B:
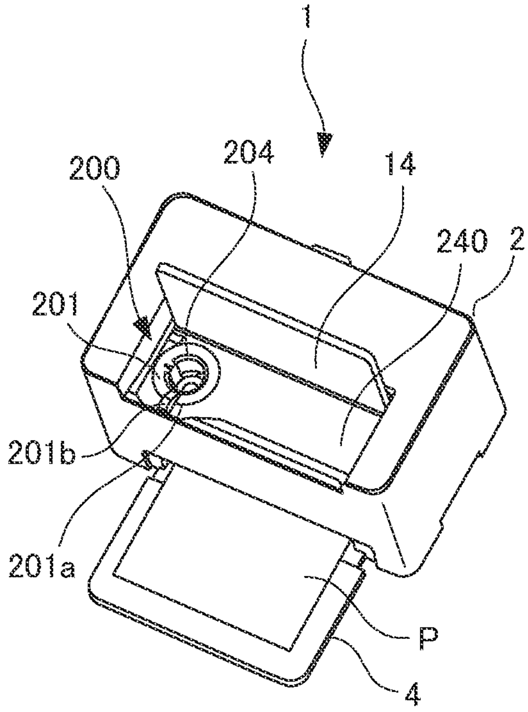
FIG. 10B is a perspective view illustrating the image forming apparatus that is in a state where the discharging tray is opened.
Figure 10C:
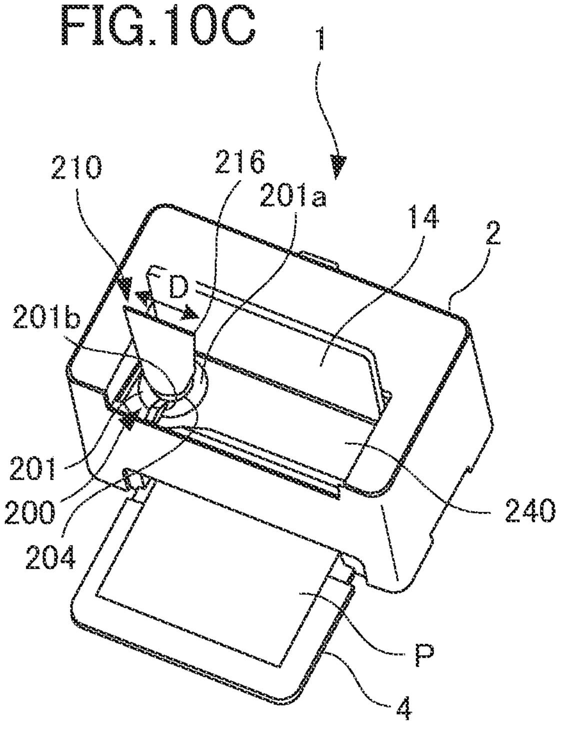
FIG. 10C is a perspective view illustrating the image forming apparatus that is in a state where a supply pack is attached to the supply portion.

Next, the supply portion 200 will be described with reference to FIGS. 10A to 11C. The discharging tray 14 is supported so that the discharging tray 14 is closed and positioned at a closing position and opened and positioned at an opening position. The closing position is a position at which the recording material P is stacked on the discharging tray 14, as illustrated in FIG. 10A. The opening position is a position at which the discharging tray 14 is opened with respect to the apparatus body 2 of the image forming apparatus 1, as illustrated in FIG. 10B. At the closing position, the discharging tray 14 covers the supply portion 200. When the discharging tray 14 is opened and positioned at the opening position, a top surface portion 240 and the supply portion 200 disposed on the top surface portion 240 are exposed to the outside. As illustrated in FIG. 10C, the supply pack 210 can be attached to and detached from the supply portion 200. Thus, the toner can be supplied from the outside to the developer container 230 by a user or a serviceman, without removing the developer container 230 from the apparatus body 2. Hereinafter, a user and a worker such as a serviceman are collectively called a user.

The supply portion 200 is disposed on the same side as the side on which the cassette 4 is disposed, with respect to the photosensitive drum 11 in the Y direction. In other words, when viewed in a gravity direction, the supply portion 200 is disposed on one side (front side) on which the cassette 4 is disposed, with respect to the photosensitive drum 11, and a later-described opening portion 91 (see FIG. 17B) is disposed on the other side (back surface side) with respect to the photosensitive drum 11. That is, when viewed in the gravity direction, the supply portion 200 is disposed on the same side as the side on which the cassette 4 is disposed, with respect to the photosensitive drum 11, and the opening portion 91 is disposed opposite to the cassette 4 with respect to the photosensitive drum 11. Thus, since the supply of the toner and the recording material P can be performed in the front side of the image forming apparatus 1, the usability can be improved.

As illustrated in FIGS. 10B and 10C, the operation portion 201 is disposed on the top surface portion 240, and forms a supplying inlet 204 that is an inlet for supplying toner. The operation portion 201 includes a ring portion 201*a* and a lever portion 201*b*. The ring portion 201*a* is disposed so as to surround the supplying inlet 204, and is rotatably supported by the top surface portion 240 or the toner receiving portion 202. The lever portion 201*b* is integrated with the ring portion 201*a*. The operation portion 201 is a member that externally controls the opening and closing operation of the main-body shutter portion 206 and a pack shutter portion 214.

Figure 11A:
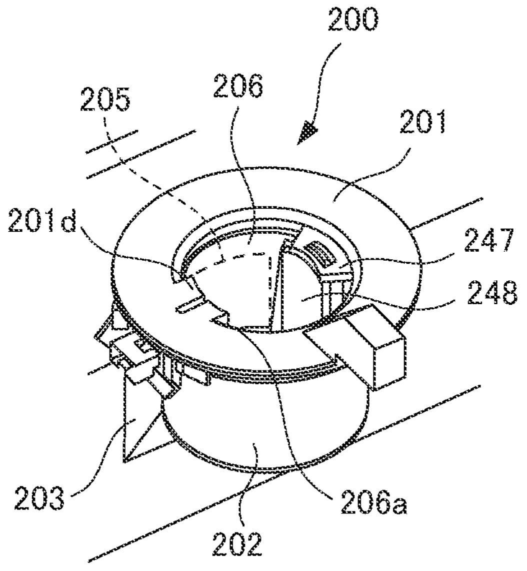
FIG. 11A is a perspective view illustrating the supply portion.
Figure 11B:
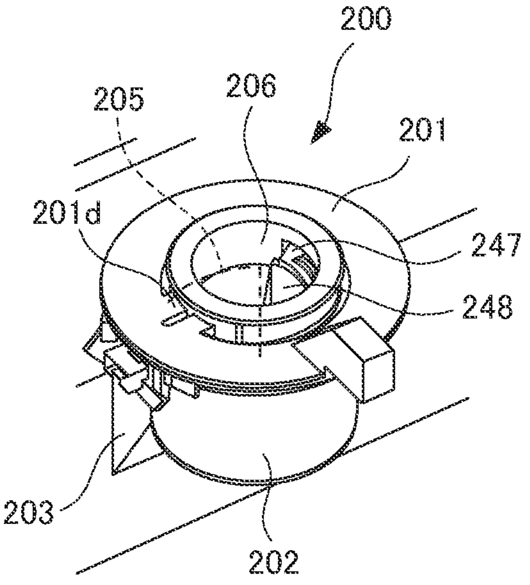
FIG. 11B is a perspective view illustrating the supply portion and a portion of the supply pack.

As illustrated in FIG. 11A, in the toner receiving portion 202, guide portions 247 and 248 are formed. The guide portions 247 and 248 are formed inside the main-body shutter portion 206, and integrated with the toner receiving portion 202. The main-body shutter portion 206 is a cylindrical member that is concentric with the toner receiving portion 202, and is rotatably disposed inside the toner receiving portion 202. The main-body shutter portion 206 includes the opening portion 207 (see FIG. 11C). At a closing position illustrated in FIG. 11A, the opening portion 207 is shifted from the side-surface opening portion 205 of the toner receiving portion 202. In addition, a seal member 243 is fixed to the main-body shutter portion 206 so as to surround the periphery of the opening portion 207.

Note that in FIG. 11A, since the side-surface opening portion 205 is covered with the main-body shutter portion 206 positioned at a closing position, the side-surface opening portion 205 is indicated by a broken line. Thus, the side-surface opening portion 205 is blocked by the main-body shutter portion 206, and the toner is not discharged to the supply path portion 203.

Figure 11C:
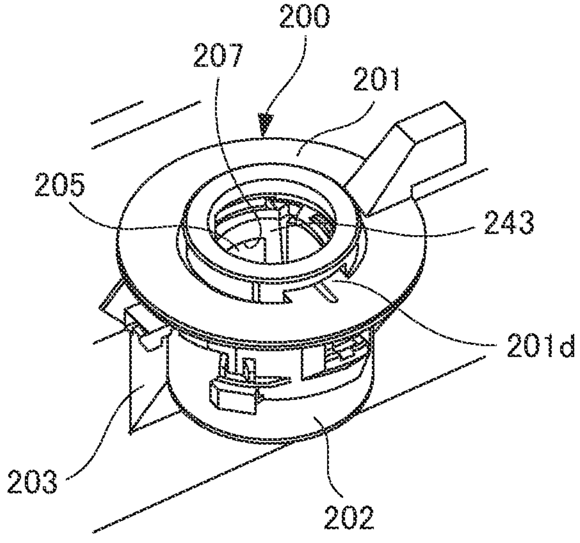
FIG. 11C is a perspective view illustrating the supply portion that is in a state where an operation portion is positioned at a supply position.
Figure 11C:
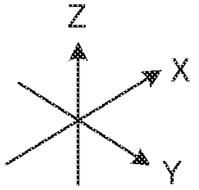

In contrast, when the main-body shutter portion 206 is positioned at an opening position illustrated in FIG. 11C, the opening portion 207 overlaps with the side-surface opening portion 205 of the toner receiving portion 202. Thus, the toner supplied from the supply pack 210 (see FIG. 10C) attached to the supply portion 200 can be discharged to the supply path portion 203 through the opening portion 207 and the side-surface opening portion 205.

In the main-body shutter portion 206, a driving-force-for-main-body-shutter-portion transmission projection 206*a* is formed. As described in detail later, the driving-force-for-main-body-shutter-portion transmission projection 206*a* receives driving force from the supply pack 210, and rotates the main-body shutter portion 206. The operation portion 201 is rotated in a state where the supply pack 210 is attached to the supply portion 200, so that the main-body shutter portion 206 is moved between a closing position and an opening position.

In the operation portion 201, a driving-force-of-operation-portion transmission projection 201*d* is formed; and the driving-force-of-operation-portion transmission projection 201*d* projects from the inner circumferential surface of the toner receiving portion 202 inward in a radial direction. The driving-force-of-operation-portion transmission projection 201*d* is engaged with the driving-force-for-main-body-shutter-portion transmission projection 206*a* via a pair of driving-force transmission surfaces 214*b* (see FIG. 14B) of the pack shutter portion 214 of the supply pack 210. When the lever portion 201*b* of the operation portion 201 is rotated counterclockwise by 90 degrees by a user, the main-body shutter portion 206 moves from a closing position illustrated in FIG. 11A, to an opening position illustrated in FIG. 11C.

When an image is formed on the recording material P, the toner is agitated by the agitating member 60 (see FIG. 9) in the storage portion 18. Thus, the side-surface opening portion 205 is required to be blocked by the main-body shutter portion 206 for preventing the toner from leaking from the side-surface opening portion 205. Thus, when an image is formed on the recording material P, the operation portion 201 is positioned at an operation position illustrated in FIG. 11A, so that the main-body shutter portion 206 is positioned at a closing position. On the other hand, when the toner is supplied from the later-described supply pack 210 to the storage portion 18, the side-surface opening portion 205 is required to be opened. Thus, when the toner is supplied from the later-described supply pack 210 to the storage portion 18, the operation portion 201 is positioned at a supply position illustrated in FIG. 11C, so that the main-body shutter portion 206 is positioned at an opening position.

Arrangement and Configuration of Supply Portion

Figure 12:
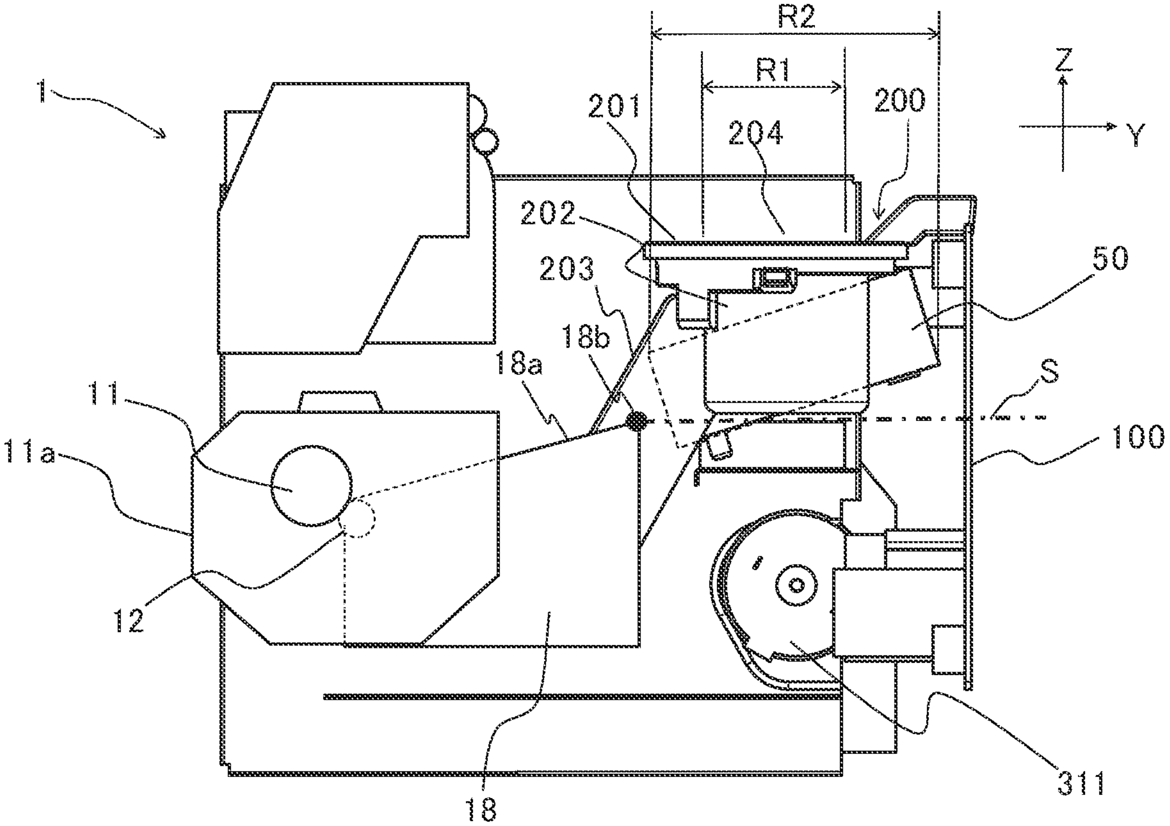
FIG. 12 is a left side view illustrating the image forming apparatus.

Next, an arrangement and a configuration of the supply portion 200 will be described in detail. FIG. 12 is a left side view illustrating the image forming apparatus 1. Note that the exterior cover 71 and the left side-plate frame 74 are not illustrated in FIG. 12.

As illustrated in FIG. 12, when the supply portion 200 is viewed in the rotation-axis direction (X direction) of the photosensitive drum 11, at least a portion of the supply portion 200 overlaps with the scanner unit 50. In FIG. 12, a portion of the scanner unit 50 that overlaps with the supply portion 200 is indicated by a dotted line. Specifically, the supply portion 200 is disposed such that when the supply portion 200 is viewed in the rotation-axis direction of the photosensitive drum 11, the toner receiving portion 202 and the supply path portion 203 of the supply portion 200 overlap with the scanner unit 50. For the description, an area in a horizontal direction (Y direction) in which the supplying inlet 204 is disposed is defined as an area R1, and an area in the horizontal direction (Y direction) in which the scanner unit 50 is disposed is defined as an area R2. In this case, when viewed in the rotation-axis direction of the photosensitive drum 11, the area R1 overlaps with the area R2.

In addition, a virtual plane S is defined as a virtual plane that extends in parallel with a horizontal plane, and that passes through a top edge portion 18*b* of a frame 18*a* of the storage portion 18. In FIG. 12, the virtual plane S is indicated by an alternate long and short dashed line. In this case, the whole of the operation portion 201 of the supply portion 200, a portion of the toner receiving portion 202, and a portion of the supply path portion 203 are positioned above the virtual plane S. In other words, a portion of the supply portion 200 is positioned above the virtual plane S. In addition, when the supply portion 200 is viewed in the rotation-axis direction of the photosensitive drum 11, the toner receiving portion 202 and a portion of the supply path portion 203 located above the virtual plane S overlap with the scanner unit 50.

Figure 13:
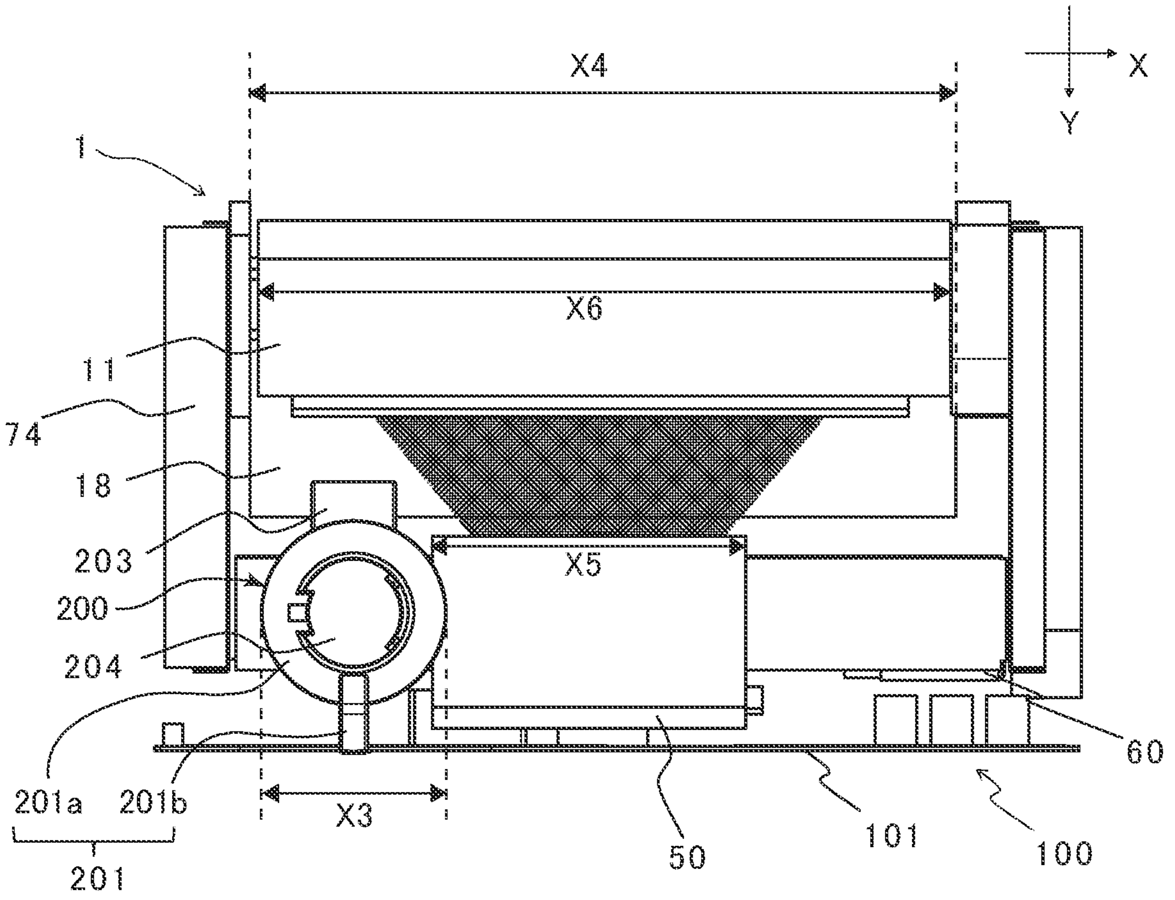
FIG. 13 is a plan view illustrating an image forming apparatus.

On the other hand, when the supply portion 200 is viewed in the rotation-axis direction of the photosensitive drum 11, a portion of the storage portion 18 overlaps with a drum frame 11*a*. In HG 12, the portion of the storage portion 18 that overlaps with the drum frame 11*a* is indicated by a broken line. Since the capacity of the storage portion 18 is increased in this manner, the amount of toner contained in the storage portion 18 can also be increased. The drum frame 11*a* supports the photosensitive drum 11 such that the photosensitive drum 11 can rotate; and the storage portion 18 supports the developing roller 12, which bears the developer, such that the developing roller 12 can rotate. FIG. 13 is a plan view illustrating the image forming apparatus 1. Note that in FIG. 13, the exterior cover 71 is not illustrated. In the X direction, a width X3 of the supply portion 200 is smaller than a width X4 of the storage portion 18.

As illustrated in FIG. 13, the laser beam emitted from the scanner unit 50 toward the photosensitive drum 11 is expanded, forming a trapezoidal shape, by a polygon mirror and a lens (both not illustrated). Thus, in the X direction, a width X5 of the scanner unit 50 is smaller than a width X6 of the photosensitive drum 11. As a result, a space is produced between the left end portion of the scanner unit 50 and the left side-plate frame 74. In the present embodiment, the supply portion 200 is disposed in the space.

In addition, in the X direction, the supply portion 200 (having a width of X3) and the scanner unit 50 (having a width of X5) are disposed adjacent to each other in an area (having a width of X4) in which the storage portion 18 is disposed. Thus, disposing the supply portion 200 less affects the size of the image forming apparatus 1.

Figure 20A:
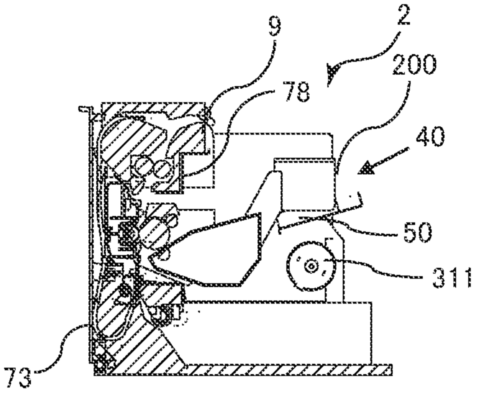
FIG. 20A is a cross-sectional view illustrating the image forming apparatus that is in a state where the back cover is closed.
Figure 20B:
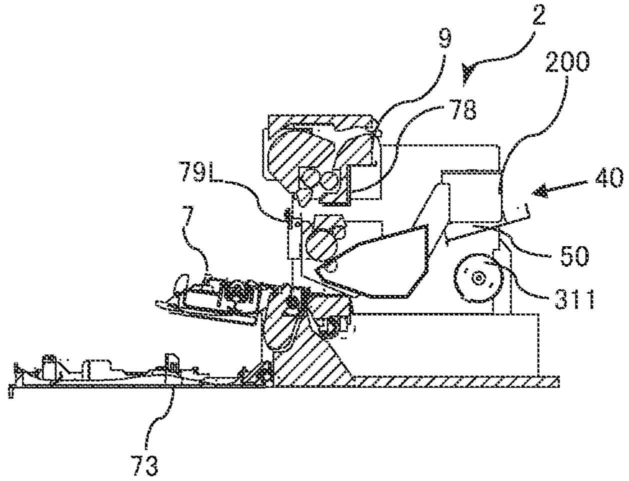
FIG. 20B is a cross-sectional view illustrating the image forming apparatus that is in a state where the transfer unit is opened.

In addition, when viewed in the gravity direction, at least a portion of the process unit 40 overlaps with the scanner unit 50. Furthermore, as illustrated in FIG. 20A, at least a portion of the process unit 40 overlaps with the fixing portion 9 when viewed in the gravity direction. Since the process unit 40, the scanner unit 50, and the fixing portion 9 are disposed in this manner, the capacity of the storage portion 18 for storing the toner can be increased without increasing the size of the image forming apparatus 1. Note that the arrangement of the process unit 40, the scanner unit 50, and the fixing portion 9 is not limited to the arrangement as described above.

In addition, as illustrated in FIG. 3, the supply portion 200 is disposed opposite to the driving motor 311 with respect to the position of the scanner unit 50 in the rotation-axis direction (X direction) of the photosensitive drum 11. In other words, the supply portion 200 is disposed opposite to the driving motor 311 across the scanner unit 50 in the rotation-axis direction (X direction). In the present embodiment, since the size of the driving motor 311 is relatively small, the driving motor 311 does not overlap with the supply portion 200 in the Z direction, as illustrated in FIG. 12. However, since the supply portion 200 is disposed opposite to the driving motor 311, with the scanner unit 50 interposed between the supply portion 200 and the driving motor 311 as described above, the driving motor 311 may be replaced with a large-sized driving motor that overlaps with the supply portion 200 in the Z direction. Thus, the flexibility in design can be improved.

Supply Pack

Figure 14A:
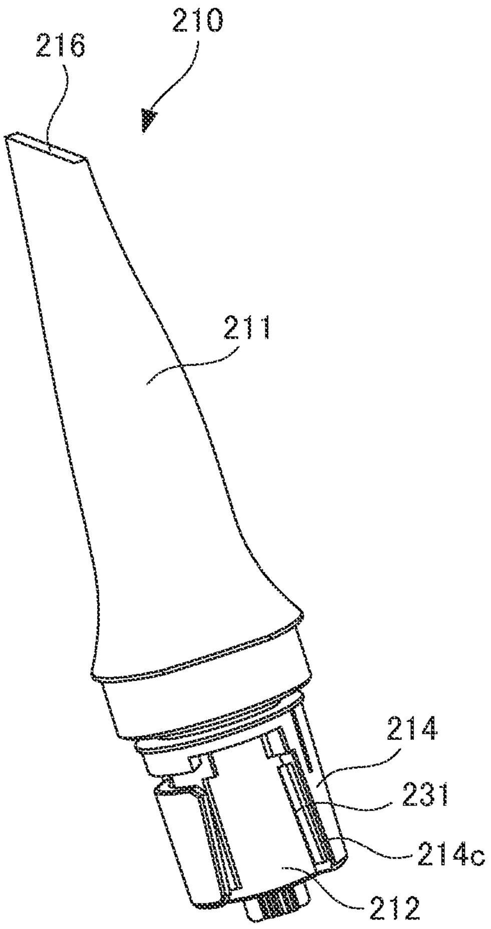
FIG. 14A is a perspective view illustrating the supply pack that is in a state where a pack shutter portion is positioned at a closing position.
Figure 14B:
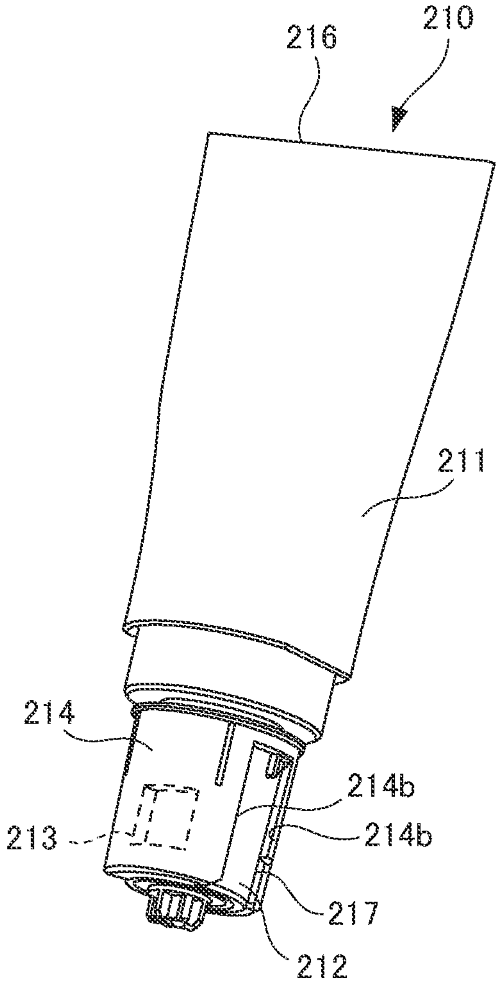
FIG. 14B is another perspective view illustrating the supply pack that is in a state where the pack shutter portion is positioned at a closing position.
Figure 15A:
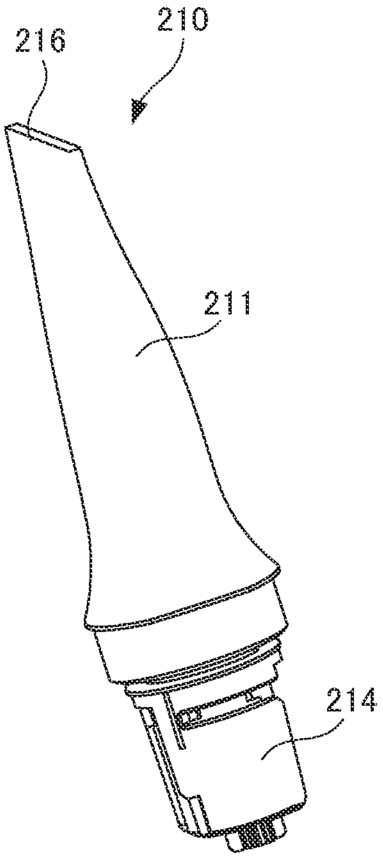
FIG. 15A is a perspective view illustrating the supply pack that is in a state where the pack shutter portion is positioned at an opening position.
Figure 15B:
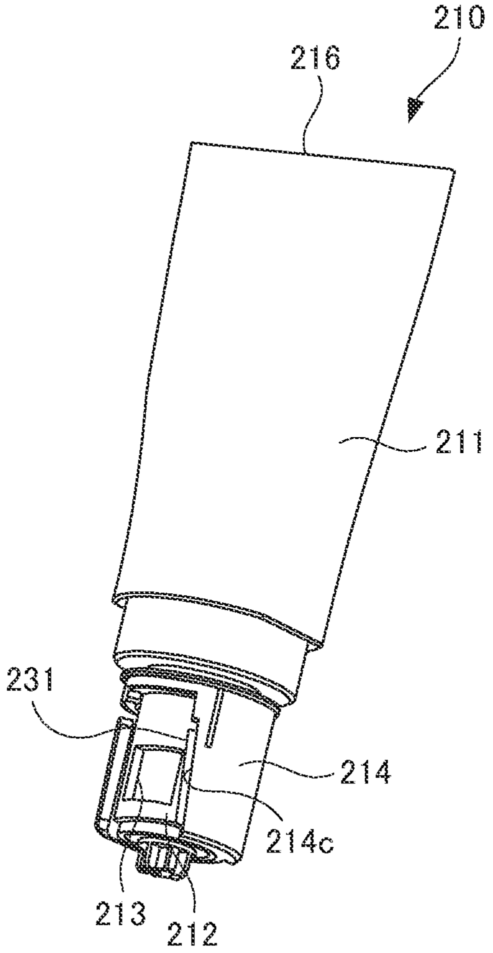
FIG. 15B is another perspective view illustrating the supply pack that is in a state where the pack shutter portion is positioned at an opening position.
Figure 16A:
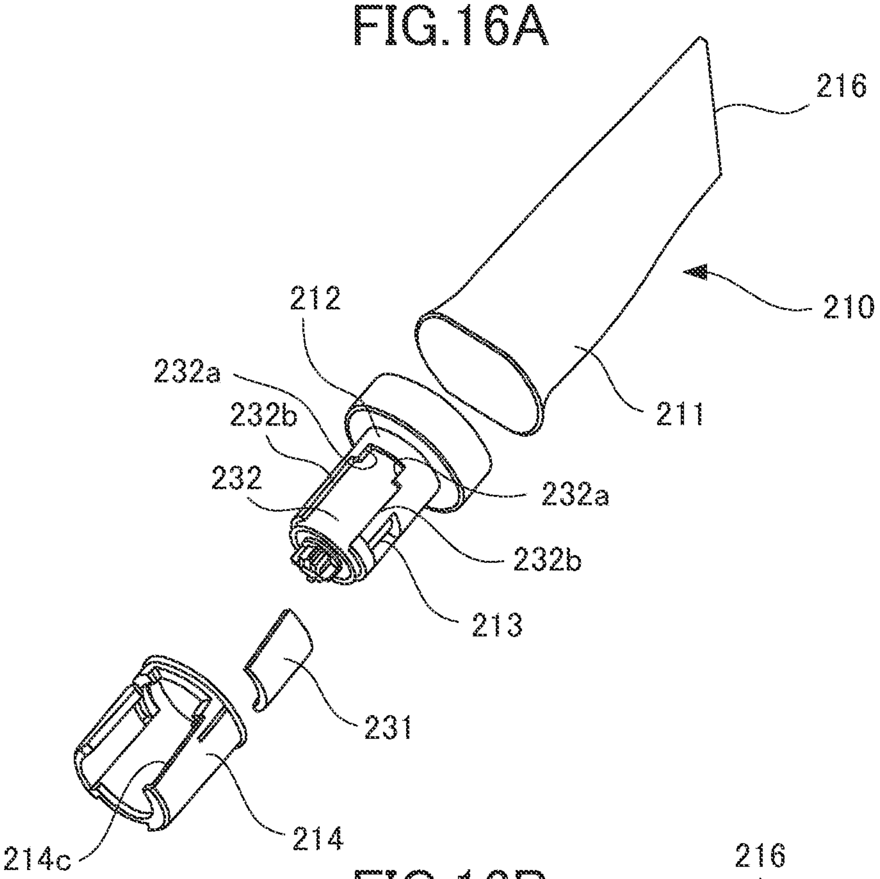
FIG. 16A is an exploded perspective view illustrating the supply pack.
Figure 16B:
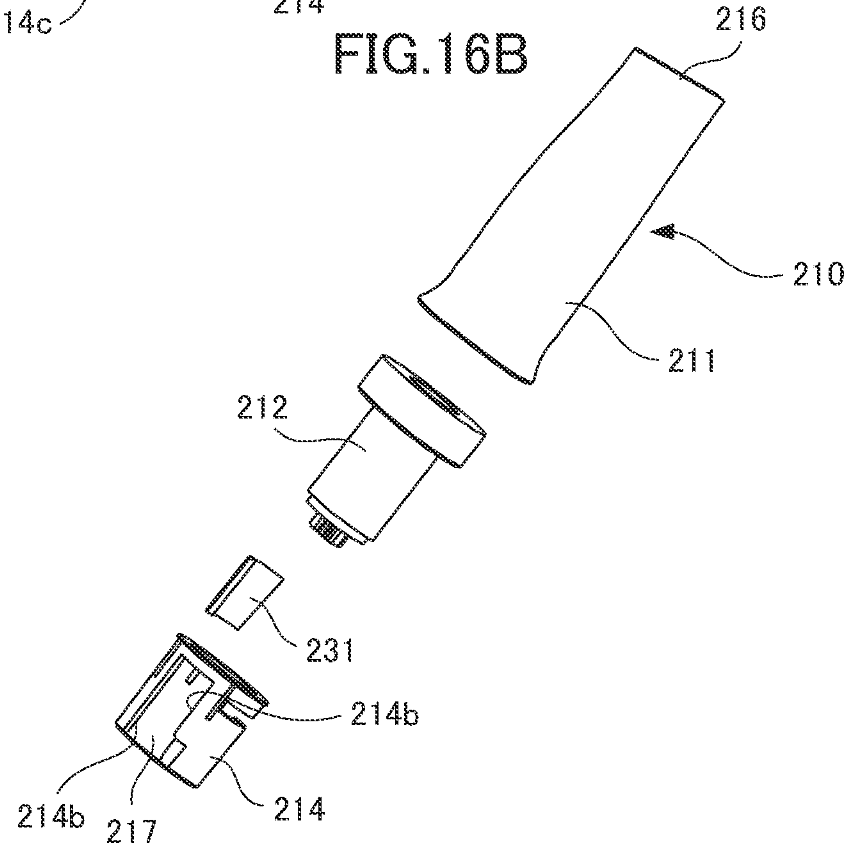
FIG. 16B is another exploded perspective view illustrating the supply pack.

Next, a configuration of the supply pack 210 will be described with reference to FIGS. 14A to 16B. FIGS. 14A and 14B are perspective views illustrating the supply pack 210 that is in a state where a pack shutter portion 214 is positioned at a closing position. FIGS. 15A and 15B are perspective views illustrating the supply pack 210 that is in a state where the pack shutter portion 214 is positioned at an opening position. FIGS. 16A and 16B are exploded perspective views illustrating the supply pack 210.

The supply pack 210 that serves as a toner container includes a pouch portion 211, an insertion portion 212, and the pack shutter portion 214. The pouch portion 211 is a pouch that contains toner to be supplied. The insertion portion 212 is a cylindrical portion that is inserted into the supplying inlet 204. The pack shutter portion 214 serves as a container shutter. The insertion portion 212 serves as a nozzle portion, and communicates with the pouch portion 211. In the insertion portion 212, an opening portion 213 is formed, and serves as an opening portion through which the toner of the pouch portion 211 is discharged to the outside. Note that although the pouch portion 211 is a pouch made of easily deformable plastic, the present disclosure is not limited to this. For example, the pouch portion 211 may be a resin bottle, or may be a paper or vinyl container.

In the pouch portion 211, a pouch end portion 216 is formed at an end portion opposite to the insertion portion 212. The pouch portion 211 is formed so as to become flatter as the pouch portion 211 extends toward the pouch end portion 216. The pouch end portion 216 extends in a radial direction of the pack shutter portion 214 orthogonal to a rotation-axis direction of the pack shutter portion 214.

The pack shutter portion 214 is a cylindrical member that is concentric with the insertion portion 212, and is disposed outside the insertion portion 212 in the radial direction. The pack shutter portion 214 includes an opening portion 214*c*. The pack shutter portion 214 is moved between a closing position at which the pack shutter portion 214 blocks the opening portion 213 of the insertion portion 212, and an opening position at which the pack shutter portion 214 opens the opening portion 213, by rotating the pack shutter portion 214 with respect to the insertion portion 212. When the opening portion 214*c* of the pack shutter portion 214 and the opening portion 213 of the insertion portion 212 overlap with each other, the toner can be supplied from the supply pack 210 to the supply portion 200.

In addition, a seal member 231 is fixed to the inner circumferential surface of the pack shutter portion 214. The seal member 231 slides on the outer circumferential surface of the insertion portion 212, and blocks the opening portion 213 of the insertion portion 212 when the pack shutter portion 214 is positioned at the closing position.

As illustrated in FIG. 16A, in the insertion portion 212, a guided portion 232 is formed. The guided portion 232 is concave with respect to the outer circumferential surface of the insertion portion 212, and includes a pair of first guided portions 232*a* and a pair of second guided portions 232*b*. When the supply pack 210 is attached to the supply portion 200, the guide portions 247 and 248 integrated with the toner receiving portion 202 are inserted into the guided portion 232. As a result, the insertion portion 212 and the toner receiving portion 202 are prevented from moving relative to each other in a circumferential direction around the rotation axis of the pack shutter portion 214.

In addition, as illustrated in FIG. 16B, in the outer circumferential surface of the pack shutter portion 214, a positioning portion 217 and driving-force transmission surfaces 214*b* are formed. The positioning portion 217 engages with the operation portion 201. The driving-force transmission surfaces 214*b* face each other via the positioning portion 217 in the circumferential direction of the outer circumferential surface of the pack shutter portion 214. That is, in the outer circumferential surface of the pack shutter portion 214, a groove portion (i.e., a concave portion that is concave inward in a radial direction of the pack shutter portion 214) is formed; the positioning portion 217 serves as a bottom surface of the groove portion (concave portion), and the driving-force transmission surfaces 214*b* serve as side surfaces of the groove portion. The groove portion is opened at a leading edge portion of the outer circumferential surface of the pack shutter portion 214 in the insertion direction of the insertion portion 212. The driving-force transmission surfaces 214*b* receive force from the driving-force-of-operation-portion transmission projection 201*d* of the operation portion 201, and thereby the pack shutter portion 214 rotates with respect to the insertion portion 212.

When the pack shutter portion 214 is positioned at a closing position, the opening portion 214*c* of the pack shutter portion 214 and the guided portion 232, which is concave with respect to the outer circumferential surface of the insertion portion 212, overlap with each other in a phase of rotation performed in the circumferential direction. In this state, the guide portions 247 and 248 are inserted into the guided portion 232 of the supply pack 210, and the opening portion 214*c* fits to the periphery of the seal member 243 disposed on the inner circumferential surface of the main-body shutter portion 206. In a state where the supply pack 210 is attached to the supply portion 200, the first guided portions 232*a* of the guided portion 232 formed upstream in the insertion direction are engaged with the guide portion 247, and the second guided portions 232*b* formed downstream in the insertion direction face the guide portion 248. Step portions between the first guided portions 232*a* and the second guided portions 232*b* form a surface that extends in the circumferential direction, and step portions between the guide portion 247 and the guide portion 248 form a surface that extends in the circumferential direction. Thus, the surface that serves as the step portions between the first guided portions 232*a* and the second guided portions 232*b* engages with the surface that serves as the step portions between the guide portion 247 and the guide portion 248, and thereby the position between the insertion portion 212 and the operation portion 201 is determined in the insertion direction. The width of the opening portion 214*c* increases as the insertion portion 212 extends toward its leading end, and the opening portion 214*c* is shaped to be opened like a cutout. Thus, in a state where the supply pack 210 is attached to the supply portion 200, a pair of portions of the opening portion 214*c* that face each other in the circumferential direction sandwich the seal member 243 in the circumferential direction.

The driving-force transmission surfaces 214*b* of the pack shutter portion 214 engage with the driving-force-of-operation-portion transmission projection 201*d* of the operation portion 201, and with the driving-force-for-main-body-shutter-portion transmission projection 206*a* of the main-body shutter portion 206. The pack shutter portion 214 is rotated by the force applied to the operation portion 201, and transmits the force to the main-body shutter portion 206 and moves the main-body shutter portion 206 together with the pack shutter portion 214. That is, the driving-force transmission surfaces 214*b* has an area, as a force receiving area, that abuts against and engages with the driving-force-of-operation-portion transmission projection 201*d*. The driving-force-of-operation-portion transmission projection 201*d* has a convex portion that extends from the inner circumferential surface of the operation portion 201 inward in a radial direction, and the driving-force transmission surfaces 214*b* has an area, as a force providing area, that abuts against and engages with the driving-force-for-main-body-shutter-portion transmission projection 206*a*.

Procedure for Supplying Toner

Next, a procedure for supplying toner by using the supply pack 210 will be described with reference to FIGS. 10A to 16B. First, as illustrated in FIGS. 10A to 10C, a user removes the recording material P stacked on the discharging tray 14, and opens the discharging tray 14 such that the discharging tray 14 moves from a closing position to an opening position. With this operation, the supply portion 200 is exposed to the outside. Since the supply portion 200 is disposed on an upper portion of the image forming apparatus 1 located on the front side, the toner can be easily supplied.

In a state where the discharging tray 14 is opened and positioned at the opening position and the supply portion 200 is exposed to the outside, the operation portion 201 is positioned at an operation position. The user then aligns the positioning cutout 217 (see FIG. 16B) of the supply pack 210, with the driving-force-of-operation-portion transmission projection 201*d* of the supply portion 200; and attaches the supply pack 210 to the supply portion 200. The supply portion 200 is designed so that if the driving-force-of-operation-portion transmission projection 201*d* and the positioning cutout 217 are not aligned with each other, the supply pack 210 interferes with the driving-force-of-operation-portion transmission projection 201*d* and cannot be inserted into the supply portion 200.

FIG. 10C is a perspective view illustrating a state where the supply pack 210 is attached to the supply portion 200. As illustrated in FIG. 10C, in the present embodiment, when a direction D which is indicated by an arrow and in which the pouch end portion 216 extends is parallel with the X direction, the supply pack 210 can be inserted into the supply portion 200. When the supply pack 210 is fully inserted into the supply portion 200, the driving-force transmission surfaces 214*b*, which form the positioning cutout 217, engage with the driving-force-of-operation-portion transmission projection 201*d* of the operation portion 201. In addition, the driving-force transmission surfaces 214*b* of the pack shutter portion 214 engage with the driving-force-for-main-body-shutter-portion transmission projection 206*a* of the main-body shutter portion 206.

That is, the rotational force of the operation portion 201 is transmitted to the pack shutter portion 214, and the rotational force of the pack shutter portion 214 is transmitted to the main-body shutter portion 206. Thus, the main-body shutter portion 206 and the pack shutter portion 214 are engaged and integrated with each other, so that the operation portion 201, the pack shutter portion 214, and the main-body shutter portion 206 move together with each other.

Then, the user rotates the lever portion 201*b* of the operation portion 201 counterclockwise by 90 degrees, as illustrated in FIG. 11C. With this operation, the operation portion 201 rotates from an operation position to a supply position, and the pack shutter portion 214 and the main-body shutter portion 206 rotate from a closing position to an opening position. As a result, the opening portion 214*c* of the pack shutter portion 214, the opening portion 213 of the insertion portion 212 of the supply pack 210, the opening portion 207 of the main-body shutter portion 206, and the side-surface opening portion 205 of the toner receiving portion 202 overlap with each other. Consequently, the toner contained in the supply pack 210 is discharged to the storage portion 18 through the supply path portion 203.

In other words, when the operation portion 201 is positioned at the supply position, the supply portion 200 is in a suppliable state in which the toner can be supplied from the supply pack 210 to the storage portion 18. In this state, the opening portion 213 of the supply pack 210 and the side-surface opening portion 205 of the toner receiving portion 202 communicate with each other.

When the supply of toner from the supply pack 210 to the storage portion 18 is completed, the user returns the operation portion 201 from the supply position to the operation position. That is, the user rotates the lever portion 201*b* of the operation portion 201 clockwise by 90 degrees. With this operation, the pack shutter portion 214 and the main-body shutter portion 206 rotate from the opening position to the closing position.

In other words, when the operation portion 201 is positioned at the operation position, the supply portion 200 is in an unsuppliable state in which the toner cannot be supplied from the supply pack 210 to the storage portion 18. In this state, the opening portion 213 of the supply pack 210 and the side-surface opening portion 205 of the toner receiving portion 202 do not communicate with each other.

Then, the user removes the supply pack 210 from the supply portion 200. Thus, in a state where the supply pack 210 is removed from the supply portion 200, since the pack shutter portion 214 is positioned at a closing position, the leakage of toner from the opening portion 213 of the supply pack 210 can be prevented.

Back Cover and Transfer Unit

Next, surroundings of the back cover 73 and the transfer unit 7 will be described with reference to FIGS. 17A to 18D. As illustrated in FIGS. 17A to 18D, in the back side of the image forming apparatus 1, the opening portion 91 that is defined by the exterior cover 71 and a back cover 73 that covers the opening portion 91 are disposed. The back cover 73 serves as an opening-and-closing member, and is supported such that the back cover 73 can be rotated around a cover engagement portion 73*d*, and can be opened and positioned at an opening position and closed and positioned at a closing position. The back cover 73 covers the opening portion 91, the transfer unit 7, and the process unit 40 when positioned at the closing position, and opens the opening portion 91 and exposes the transfer unit 7 and the process unit 40 to the outside when positioned at the opening position. In addition, the transfer unit 7 is supported such that the transfer unit 7 can be rotated around a pivot shaft 7*c*, and can be opened and positioned at an opening position and closed and positioned at a closing position.

On an outside surface 73*b* of the back cover 73, that is, on a surface that constitutes the exterior surface of the housing 72, a holding portion 73*c* is disposed. A user can hold the holding portion 73*c* when the user opens or closes the back cover 73. On an inside surface 73*f* of the back cover 73 opposite to the outside surface 73*b*, a plurality of (three in the present embodiment) engaging hooks 73*a*, a plurality of conveyance ribs 73*g*, and a pressing rib 73*e* that serves as a pressing portion are disposed.

Figure 17A:
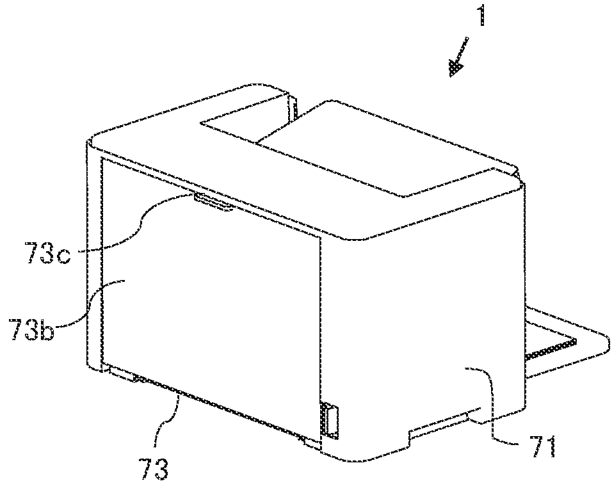
FIG. 17A is a perspective view illustrating the image forming apparatus that is in a state where a back cover is closed.
Figure 18A:
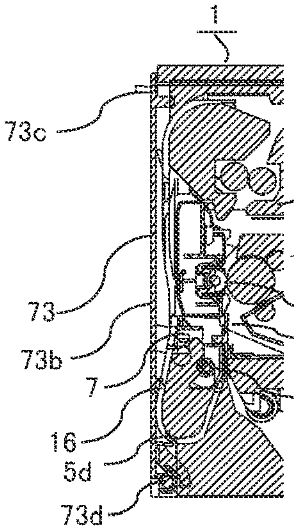
FIG. 18A is a cross-sectional view illustrating the image forming apparatus that is in a state where the back cover is closed.

The back cover 73 is held at a closing position illustrated in FIGS. 17A and 18A, by the engaging hooks 73*a* engaging with the exterior cover 71. In addition, in a state where the back cover 73 is positioned at the closing position, the transfer unit 7 is pulled in the interior of the apparatus body 2 by a link member (not illustrated). Thus, the transfer unit 7 is enclosed until the transfer unit 7 is operated by a user. When the transfer unit 7 is positioned at the closing position, the transfer roller 7*a*, which serves as a transfer portion, transfers a toner image borne by the photosensitive drum 11, onto a sheet.

Figure 17B:
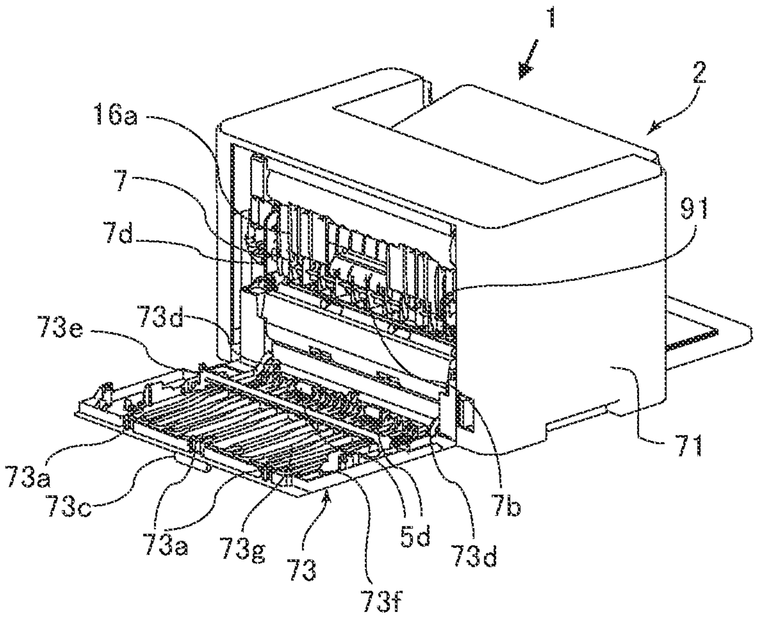
FIG. 17B is a perspective view illustrating the image forming apparatus that is in a state where the back cover is opened.
Figure 18B:
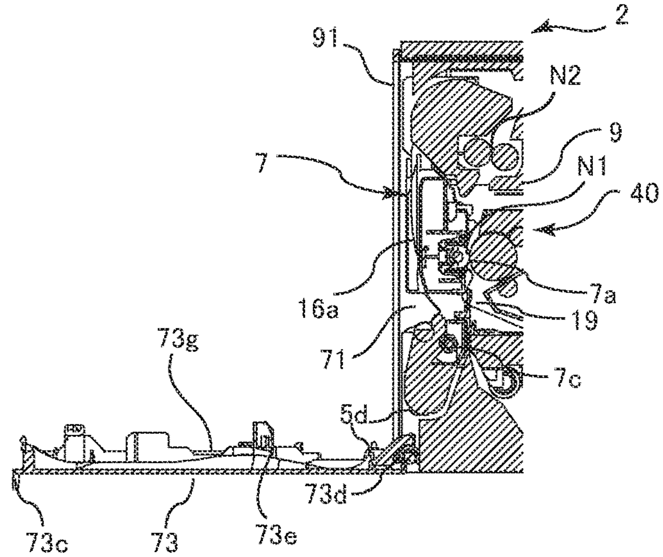
FIG. 18B is a cross-sectional view illustrating the image forming apparatus that is in a state where the back cover is opened.

As illustrated in FIGS. 17B and 18B, when the back cover 73 is opened and positioned at the opening position, the duplex conveyance path 16 is opened. The duplex conveyance path 16 is a path through which the recording material P conveyed by the duplex-conveyance roller pair 5*d* passes. The duplex conveyance path 16 is formed by the plurality of conveyance ribs 73*g* of the back cover 73 and a plurality of conveyance ribs 16*a* formed on an outside surface of the transfer unit 7. In other words, the conveyance ribs 73*g* serving as a guide portion form a portion of the duplex conveyance path 16 serving as a second conveyance path when the back cover 73 is positioned at the closing position. That is, the back cover 73 can move between the closing position at which the back cover 73 covers the duplex conveyance path 16, and the opening position at which the back cover 73 opens the duplex conveyance path 16 and exposes the duplex conveyance path 16 to the outside. The duplex conveyance path 16 and the conveyance path 19 are conveyance paths through which a sheet is conveyed.

The pressing roller 9*b* of the fixing portion 9 is abutted against or separated from the heating roller 9*a* via a link (not illustrated) in accordance with the opening-and-closing operation of the back cover 73. Thus, when the back cover 73 is positioned at the opening position and the duplex conveyance path 16 is opened, the pressing roller 9*b* is separated from the heating roller 9*a*.

Figure 17C:
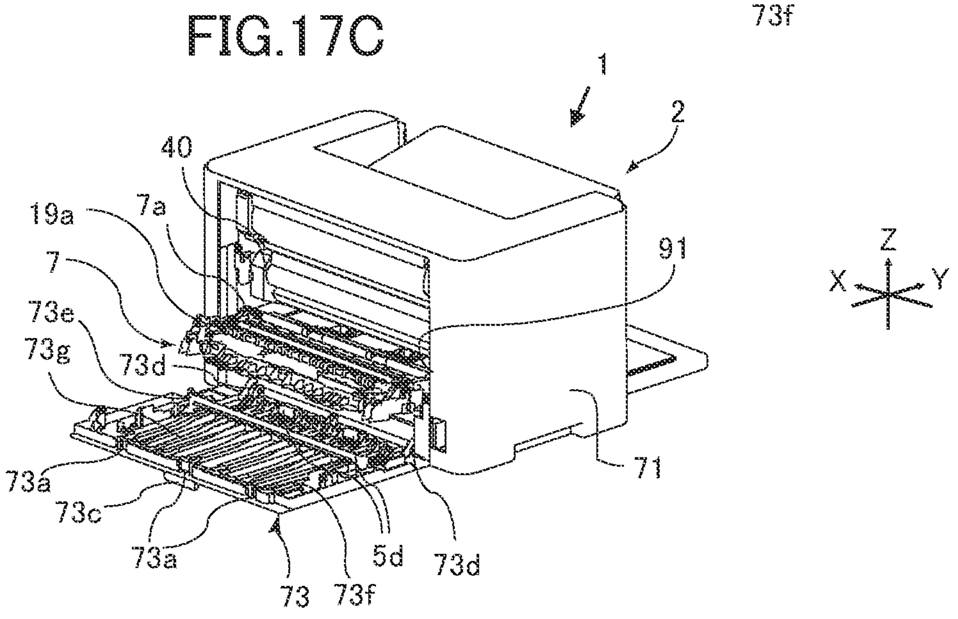
FIG. 17C is a perspective view illustrating the image forming apparatus that is in a state where a transfer unit is opened.
Figure 18C:
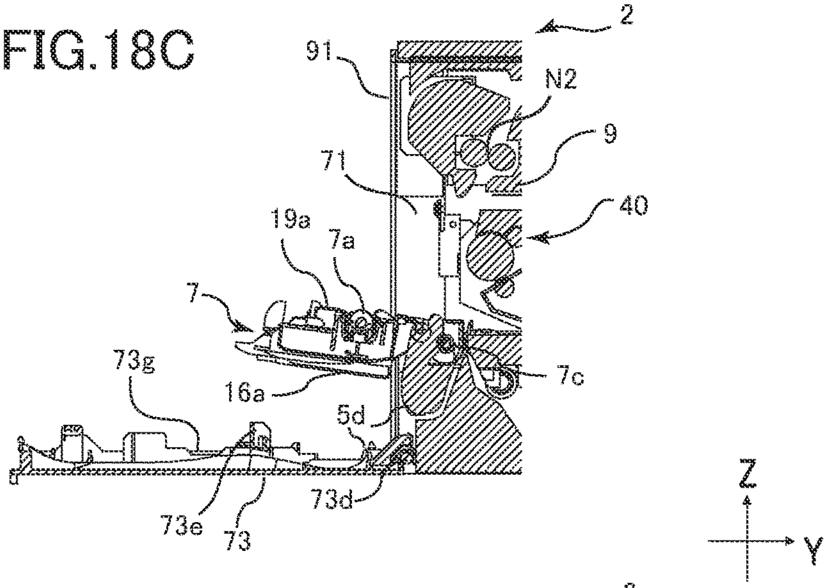
FIG. 18C is a cross-sectional view illustrating the image forming apparatus that is in a state where the transfer unit is opened.

As illustrated in FIGS. 17C and 18C, when the transfer unit 7 is rotated around the pivot shaft 7*c* and opened in a state where the back cover 73 is positioned at the opening position, the conveyance path 19 is opened. The conveyance path 19 serves as a first conveyance path, and is a path through which the recording material P passes. The recording material P is fed by the pickup roller 3, and conveyed by the conveyance roller pair 5*c*, the transfer nip N1, and the fixing nip N2. That is, the transfer unit 7 can move between the closing position and the opening position. The closing position is a first position at which the transfer unit 7 covers the conveyance path 19, and the opening position is a second position at which the transfer unit 7 opens the conveyance path 19 and exposes the conveyance path 19 to the outside. Note that when the transfer unit 7 is positioned at the opening position, the conveyance path 19 is opened even in a state where the process unit 40 is attached to the apparatus body 2.

On the inside surface of the transfer unit 7, conveyance ribs 19*a* that constitute the conveyance path 19 are disposed. On the outside surface of the transfer unit 7, a holding portion 7*b* (see FIG. 17B) is disposed in addition to the plurality of conveyance ribs 16*a*. Thus, the transfer unit 7 is rotated between the closing position and the opening position by a user holding and moving the holding portion 7*b*.

Jam Handling

Next, a jam handling method performed when a jam occurs in the duplex conveyance path 16 or the conveyance path 19 will be described. If a jam of the recording material P occurred during an image forming operation, a user opens the back cover 73 from the closing position to the opening position, as illustrated in FIGS. 17A, 17B, 18A, and 18B. With this operation, the duplex conveyance path 16 is opened. Thus, if the jam occurred in the vicinity of the duplex conveyance path 16, the user can remove the jammed recording material P.

If a jam occurred in the vicinity of the transfer nip N1, a user opens the back cover 73 and positions the back cover 73 at the opening position, and opens the transfer unit 7 and positions the transfer unit 7 at the opening position, as illustrated in FIGS. 17C and 18C. With this operation, the conveyance path 19 is opened, and the user can remove the recording material P jammed in the vicinity of the conveyance path 19. In this manner, even if a jam occurs in the duplex conveyance path 16 or the conveyance path 19, a user can handle the jam in the back surface side of the image forming apparatus 1 while the process unit 40 remains attached to the apparatus body 2. Thus, the jam handling is not troublesome, so that the jam handling performance can be improved.

Figure 18D:
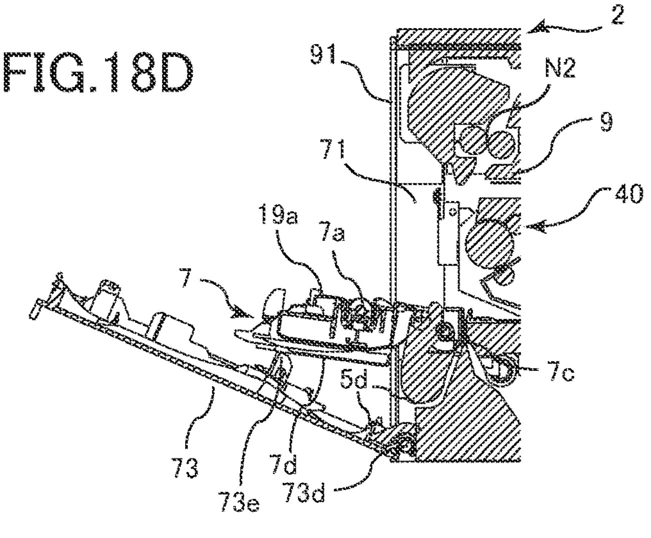
FIG. 18D is a cross-sectional view illustrating the image forming apparatus that is in a state where the back cover is being closed.

After the jam handling is completed, a user closes the back cover 73 from the opening position to the closing position while the transfer unit 7 is left at the opening position, as illustrated in FIG. 18D. In this case, until the back cover 73 is closed from the opening position by about 25°, the back cover 73 pivots alone. After that, the pressing rib 73*e* of the back cover 73 contacts a pressed portion 7*d* of the transfer unit 7. If the back cover 73 is continuously closed toward the closing position, the transfer unit 7 is pressed by the pressing rib 73*e*, and the transfer unit 7 is also moved from the opening position toward the closing position. Thus, since the closing operation for the transfer unit 7 may not be performed, the usability can be improved. Note that a user may close the transfer unit 7 before closing the back cover 73.

Attachment and Detachment of Process Unit

Next, with reference to FIGS. 19A to 20D, a method of attaching and detaching the process unit 40 will be described. For example, the attachment and detachment of the process unit 40 are performed when the process unit 40 is replaced with another process unit, or when the maintenance is performed on the process unit 40. As illustrated in FIGS. 19A, 19B, 20A, and 20B, when removing the process unit 40 from the apparatus body 2, a user moves the back cover 73 to the opening position, and moves the transfer unit 7 to the opening position, as in the above-described jam handling. With this operation, the process unit 40 is exposed to the outside. In this state, however, the process unit 40 is fixed to the left side-plate frame 74 and the right side-plate frame 75 by fixing members 79L and 79R.

Note that although the process unit 40 is fixed to the left side-plate frame 74 and the right side-plate frame 75, in the present embodiment, by using the fixing members 79L and 79R that are metal-plate members, the present disclosure is not limited to this. For example, the process unit 40 may be held in the apparatus body 2 by urging members such as springs, or by using the urging force of the transfer roller 7*a* of the transfer unit 7 to the photosensitive drum 11.

Figure 19C:
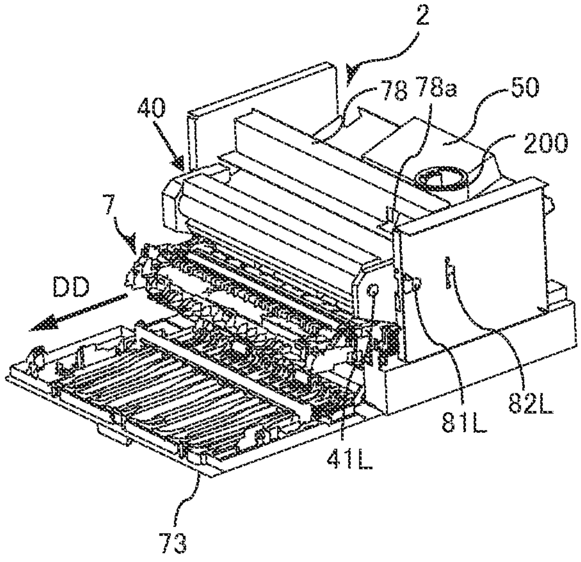
FIG. 19C is a perspective view illustrating a state where the removal of the process unit is started.
Figure 19C:
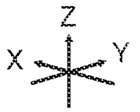
Figure 20C:
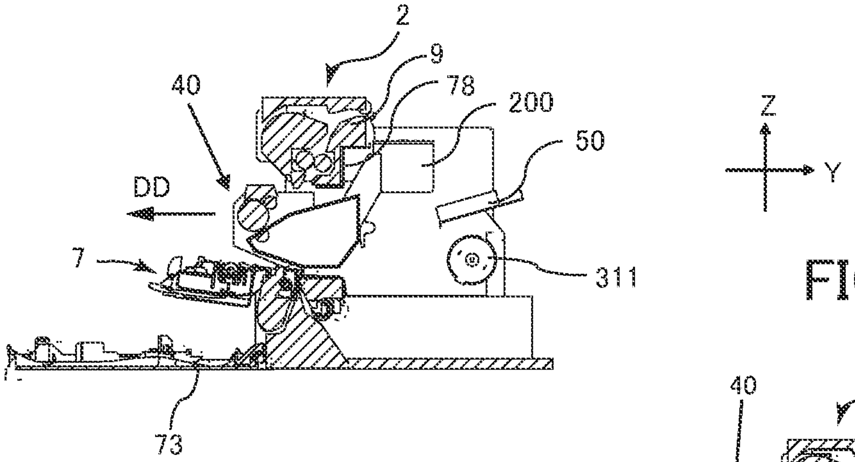
FIG. 20C is a cross-sectional view illustrating a state where the removal of the process unit is started.

For removing the process unit 40 from the apparatus body 2, the fixing members 79L and 79R are removed, first. Then, the engagement in the driving-force transmission portion between the pinion gear of the driving motor 311 and the photosensitive drum 11 is disengaged, and the process unit 40 is moved toward a removing direction DD, as illustrated in FIGS. 19C and 20C, that is opposite to the attachment direction AD (see FIG. 5). With this operation, the left positioning boss 41L and the right positioning boss are respectively separated from the left positioning portion 81L and the right positioning portion 81R, and the left rotation-prevention boss 42L and the right rotation-prevention boss are respectively separated from the left rotation-prevention portion 82L and the right rotation-prevention portion 82R. That is, when the back cover 73 is positioned at the opening position and the transfer unit 7 is positioned at the opening position, the process unit 40 can be attached to and detached from the apparatus body 2 through the opening portion 91. Since the opening portion 91 is disposed on the back side of the apparatus body 2 and can have a relatively large area, the attachment and detachment of the process unit 40 becomes easy, so that the maintainability for the process unit 40 can be improved.

In the present embodiment, the fixing portion 9 is held by a fixing stay 78 that is suspended between the left side-plate frame 74 and the right side-plate frame 75. In addition, for reducing the size of the image forming apparatus 1, the supply portion 200, which is a portion of the process unit 40, overlaps with the fixing portion 9 in the X direction and the Z direction. In other words, the supply portion 200 is disposed upstream of the fixing portion 9 in the removing direction DD, and when viewed in the removing direction DD, the supply portion 200 is disposed such that at least a portion of the supply portion 200 overlaps with the fixing portion 9.

Figure 19D:
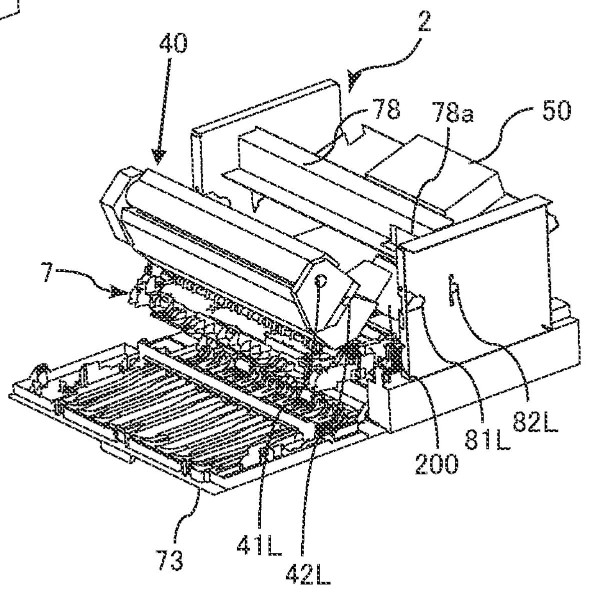
FIG. 19D is a perspective view illustrating a state where the removal of the process unit is being performed.
Figure 20D:
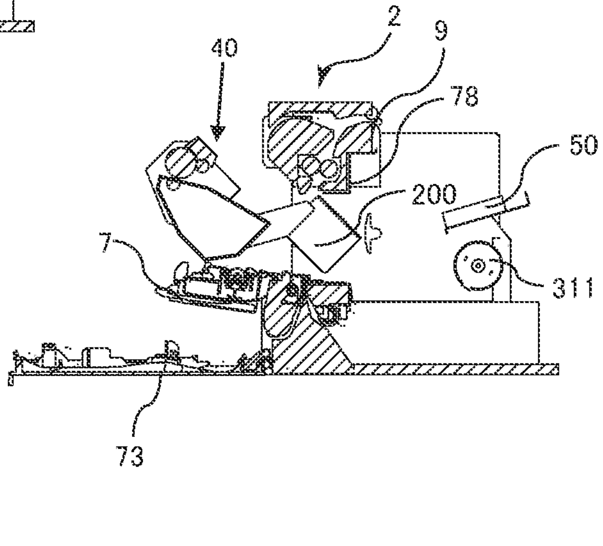
FIG. 20D is a cross-sectional view illustrating a state where the removal of the process unit is being performed.

Thus, as illustrated in FIGS. 19D and 20D, in a process in which the process unit 40 is drawn off from the apparatus body 2, a user moves the process unit 40 in the removing direction DD while rotating the process unit 40 on an axis extending in parallel with the X direction. In addition, since an opening 78*a* is formed in the fixing stay 78 that serves as a holding member, the supply portion 200 can pass through the opening 78*a* when the process unit 40 is drawn off from the apparatus body 2.

Note that the process unit 40 may not overlap with the fixing portion 9 in the drawing direction DD so that the process unit 40 can be drawn off from the apparatus body 2 in the drawing direction DD without being rotated. In addition, the process unit 40 may not overlap with the fixing portion 9 in the Z direction so that the process unit 40 can be drawn off from the apparatus body 2 in the −Y direction.

The process unit 40 may be attached to the apparatus body 2 in the order reverse to the order of the above-described method of removing the process unit 40. That is, the process unit 40 is attached to the apparatus body 2 in the attachment direction AD (see FIG. 5) while rotated around the X axis.

As described above, in the image forming apparatus 1 of the present embodiment that has a toner supply system, the jam handling and the attachment and detachment of the process unit 40 are both performed through the opening portion 91 disposed on the back surface side of the image forming apparatus 1. In this configuration, the space efficiency of the interior of the image forming apparatus 1 can be increased. For example, an area taken for the trajectory of movement of the process unit 40 when the process unit 40 is attached to and detached from the apparatus body 2 can be reduced. In addition, since the opening portion 91 can have a relatively large area, the workability for the attachment and detachment of the process unit 40 and the jam handling is increased. Therefore, the apparatus body 2 can be downsized while the capacity of the storage portion 18 that contains toner can be increased, and the jam handling performance and the maintainability for the process unit 40 can be improved.

Other Embodiments

Note that although the image forming apparatus 1 includes the duplex conveyance path 16, in the above-described embodiment, for forming images on both sides of the recording material P, the present disclosure is not limited to this. For example, the image forming apparatus 1 may not include the duplex conveyance path 16, and may form an image on only one side of the recording material P. In this case, the transfer unit 7 may not be able to be opened and closed, and the transfer roller 7*a* may be rotatably supported by the back cover 73, for example. In this configuration, the conveyance path 19 is opened by opening the back cover 73.

In addition, in the above-described embodiment, the supply portion 200 and the cassette 4 are disposed, when viewed in the gravity direction, on one side (i.e., front side) with respect to the photosensitive drum 11, and the opening portion 91 is disposed on the other side (i.e., back surface side). However, the present disclosure is not limited to this. For example, the supply portion 200 may be disposed on the other side (i.e., back surface side) with respect to the photosensitive drum 11.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-086127, filed May 21, 2021, which is hereby incorporated by reference herein in its entirety.

What is claimed is:

1. An image forming apparatus comprising:

an apparatus body including an opening portion, and an opening-and-closing member configured to move between a closing position at which the opening-and-closing member closes the opening portion and an opening position at which the opening-and-closing member opens the opening portion;

a process unit detachably attached to and supported by the apparatus body and configured to form an image on a sheet, the process unit including an image bearing member configured to bear a toner image and rotate, a toner storage portion configured to store toner, and a supply portion configured to communicate with the toner storage portion and receive toner supplied from an outside of the process unit in a state where the process unit is attached to the apparatus body;

a discharging tray on which the sheet discharged from the apparatus body is stacked after the image is formed on the sheet; and a discharging roller pair configured to discharge the sheet to the discharging tray in a discharging direction, wherein when viewed in a gravity direction, the supply portion is disposed on a downstream side of the apparatus body in the discharging direction, and the opening portion is disposed on an upstream side of the apparatus body in the discharging direction, and wherein in a case where the opening-and-closing member is positioned at the opening position, the process unit is configured to be attached to and detached from the apparatus body through the opening portion.

2. The image forming apparatus according to claim 1, wherein the discharging tray is configured to move between a first position and a second position, wherein the supply portion is exposed to an outside of the image forming apparatus when the discharging tray is in the first position, and wherein the discharging tray covers the supply portion in the second position.

3. The image forming apparatus according to claim 1, further comprising a scanner unit configured to emit a laser beam to the image bearing member and form an electrostatic latent image on the image bearing member, wherein when viewed in a rotation-axis direction of the image bearing member, at least a portion of the process unit overlaps with the scanner unit.

4. The image forming apparatus according to claim 3, further comprising a driving source configured to drive the image bearing member, wherein the supply portion is disposed opposite to the driving source across the scanner unit in the rotation-axis direction of the image bearing member.

5. The image forming apparatus according to claim 3, further comprising a fixing portion configured to fix the toner image, having been transferred onto the sheet, to the sheet, wherein when viewed in the gravity direction, at least a portion of the process unit overlaps with the fixing portion.

6. The image forming apparatus according to claim 5, wherein the supply portion is disposed upstream of the fixing portion in a detaching direction of the process unit, and wherein when viewed in the detaching direction, at least a portion of the supply portion overlaps with the fixing portion.

7. The image forming apparatus according to claim 6, further comprising a holding member configured to hold the fixing portion, wherein the holding member includes an opening through which the supply portion passes in a case where the process unit is detached from the apparatus body in the detaching direction.

8. The image forming apparatus according to claim 6, wherein the process unit is configured to be detached by rotating around an axis parallel with the rotation-axis direction of the image bearing member in a case where the process unit is detached from the apparatus body.

9. The image forming apparatus according to claim 1, wherein the opening-and-closing member includes a guide portion configured to form a portion of a conveyance path through which the sheet is guided at the closing position, and open the conveyance path at the opening position in a state where the process unit is attached to the apparatus body.

10. The image forming apparatus according to claim 9, further comprising a transfer unit configured to move between a third position and a fourth position, the transfer unit including a transfer portion configured to transfer a toner image borne by the image bearing member onto the sheet in a case where the transfer unit is positioned at the third position, wherein the process unit is configured to be attached to and detached from the apparatus body in a case where the opening-and-closing member is positioned at the opening position and the transfer unit is positioned at the fourth position.

11. The image forming apparatus according to claim 10, wherein the conveyance path includes a first conveyance path through which a sheet heading toward the transfer portion passes, and a second conveyance path configured to direct a sheet having a first surface onto which an image has been transferred toward the first conveyance path again, wherein the guide portion is configured to constitute a portion of the second conveyance path in a case where the opening-and-closing member is positioned at the closing position, and wherein the transfer unit is configured to open the first conveyance path at the fourth position in a state where the process unit is attached to the apparatus body.

12. The image forming apparatus according to claim 10, wherein the opening-and-closing member includes a pressing portion configured to move the transfer unit from the fourth position to the third position while the opening-and-closing member moves from the opening position to the closing position.

13. An image forming apparatus comprising:

an apparatus body including an opening portion, and an opening-and-closing member configured to move between a closing position at which the opening-and-closing member closes the opening portion and an opening position at which the opening-and-closing member opens the opening portion;

a process unit detachably attached to and supported by the apparatus body and configured to form an image on a sheet, the process unit including an image bearing member configured to bear a toner image and rotate, a toner storage portion configured to store toner, and a supply portion configured to communicate with the toner storage portion and receive toner supplied from an outside of the process unit in a state where the process unit is attached to the apparatus body;

a sheet supporting portion configured to support the sheet, the sheet being to be set to the sheet supporting portion in a sheet setting direction; and a rotary feeding member configured to feed the sheet on the sheet supporting portion, wherein when viewed in a gravity direction, the supply portion is disposed on an upstream side of the apparatus body in the sheet setting direction, and the opening portion is disposed on a downstream side of the apparatus body in the sheet setting direction, and wherein in a case where the opening-and-closing member is positioned at the opening position, the process unit is configured to be attached to and detached from the apparatus body through the opening portion.

14. The image forming apparatus according to claim 13, further comprising a scanner unit configured to emit a laser beam to the image bearing member and form an electrostatic latent image on the image bearing member, wherein when viewed in a rotation-axis direction of the image bearing member, at least a portion of the process unit overlaps with the scanner unit.

15. The image forming apparatus according to claim 14, further comprising a driving source configured to drive the image bearing member, wherein the supply portion is disposed opposite to the driving source across the scanner unit in the rotation-axis direction of the image bearing member.

16. The image forming apparatus according to claim 14, further comprising a fixing portion configured to fix the toner image, having been transferred onto the sheet, to the sheet, wherein when viewed in the gravity direction, at least a portion of the process unit overlaps with the fixing portion.

17. The image forming apparatus according to claim 16, wherein the supply portion is disposed upstream of the fixing portion in a detaching direction of the process unit, and wherein when viewed in the detaching direction, at least a portion of the supply portion overlaps with the fixing portion.

18. The image forming apparatus according to claim 17, further comprising a holding member configured to hold the fixing portion, wherein the holding member includes an opening through which the supply portion passes in a case where the process unit is detached from the apparatus body in the detaching direction.

19. The image forming apparatus according to claim 17, wherein the process unit is configured to be detached by rotating around an axis parallel with the rotation-axis direction of the image bearing member when a case where the process unit is detached from the apparatus body.

20. The image forming apparatus according to claim 13, wherein the opening-and-closing member includes a guide portion configured to form a portion of a conveyance path through which the sheet is guided at the closing position, and open the conveyance path at the opening position in a state where the process unit is attached to the apparatus body.

* * * * *